United States Patent
de Melo Kort-Kamp et al.

(10) Patent No.: US 11,359,839 B2
(45) Date of Patent: Jun. 14, 2022

(54) PASSIVE RADIATIVE THERMOSTAT

(71) Applicant: Triad National Security, LLC, Los Alamos, NM (US)

(72) Inventors: Wilton Junior de Melo Kort-Kamp, Los Alamos, NM (US); Abul Kalam Azad, Los Alamos, NM (US); Matthew Thomas Reiten, Los Alamos, NM (US); Diego Alejandro Roberto Dalvit, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 16/869,183

(22) Filed: May 7, 2020

(65) Prior Publication Data

US 2020/0353728 A1    Nov. 12, 2020

Related U.S. Application Data

(60) Provisional application No. 62/844,909, filed on May 8, 2019.

(51) Int. Cl.
*F24S 70/10*    (2018.01)
*B82Y 20/00*    (2011.01)

(52) U.S. Cl.
CPC ............... *F24S 70/10* (2018.05); *B82Y 20/00* (2013.01)

(58) Field of Classification Search
CPC ........... B82Y 20/00; F24S 70/10; B64G 1/503
See application file for complete search history.

(56) References Cited

U.S. PATENT DOCUMENTS

| | | | | |
|---|---|---|---|---|
| 8,908,253 | B2* | 12/2014 | Hendaoui | B64G 1/503 359/288 |
| 9,442,313 | B2* | 9/2016 | Choi | C03C 17/3644 |
| 2012/0301642 | A1* | 11/2012 | Roberts | G02B 5/008 428/34 |
| 2013/0101848 | A1* | 4/2013 | Banerjee | C09K 11/691 428/402 |
| 2017/0297750 | A1* | 10/2017 | Liu | B64G 1/503 |
| 2019/0040526 | A1* | 2/2019 | Taha | C23C 14/5806 |

OTHER PUBLICATIONS

"Fabrication of VO2-based multilayer structure with variable emittance" by Wang et al, Applied Surface Science, vol. 344, pp. 230-235 (Year: 2015).*

"Frequency tunable near-infrared metamaterials based on VO2 phase transition" by Dicken et al, Optics Express, vol. 17, No. 20, 18330 (Year: 2009).*

(Continued)

*Primary Examiner* — Robert Tavlykaev

(57) ABSTRACT

A passive radiative thermostat (PRT) is provided. The PRT comprises a phase-change part comprising a thermochromic phase change material; and a wavelength-selector part designed to create electromagnetic resonances in a wavelength range. The wavelength range may include the visible range, the near-infrared range, or the mid-infrared range. The wavelength-selector part may include an electromagnetic cavity resonator or an electromagnetic plasmonic resonator. Further, the phase-change part may include a thermochromic film; and the wavelength-selector part may include a dielectric spacer.

26 Claims, 17 Drawing Sheets

(56) References Cited

OTHER PUBLICATIONS

"The design of ultra-broadband selective near-perfect absorber based on photonic structures to achieve near-ideal daytime radiative cooling"by Wu et al, Materialsand Design, vol. 139, pp. 104-111 (Year: 2018).*

Trombe, F. "Perspectives sur l'utilisation des rayonnements solaires et terrestres dans certains regions du monde" Revue Générate Thermique 1967, 6, 1285-1314.

Catalanotti, S. et al. "The radiative cooling of selective surfaces" Sol. Energy 1975, 17, 83-89.

Bartoli, B. et al. "Nocturnal and diurnal performances of selective radiators" Appl. Energy 1977, 3, 267-286.

Granqvist, C. G. et al. "Radiative cooling to low temperatures: general considerations and application to selectively emitting SiO films" J. Appl. Phys. 1981, 52(6), 4205-4220.

Gentle A. R. et al. "Radiative heat pumping from the earth using surface phonon resonant nanoparticles" Nano Lett. 2010, 10, 373-379.

Zhu, L. et al. "Radiative cooling of solar absorbers using a visibly transparent photonic crystal thermal blackbody" PNAS 2015, 112(40), 12282-12287.

Zhu, L. et al. "Radiative cooling of solar cells" Optica 2014, 1(1), 32-38.

Safi, T. S. et al. "Improving photovoltaic performance through radiative cooling in both terrestrial and extraterrestrial environments" Optics Express 2015, 23, A1120-A1128.

Hsu, P.-C. et al. "Radiative human body cooling by nanoporous polyethylene textile" Science 2016, 353(6303), 1019-1023.

Rephaeli, E. et al. "Ultrabroadband photonic structures to achieve high-performance daytime radiative cooling" Nano Lett. 2013, 13, 1457-1461.

Hossain, M. M. et al. "A metamaterial emitter for highly efficient radiative cooling" Adv. Optical Mater. 2015, 3, 1047-1051.

Raman, A. P. et al. "Passive radiative cooling below ambient air temperature under direct sunlight" Nature 2014, 515, 540-544.

Chen, Z. et al. "Radiative cooling to deep sub-freezing temperatures through a 24-h day-nigh cycle" Nat. Comm. 2016, 7(13729), 1-5.

Zhai, Y; et al. "Scalable-manufactured randomized glass-polymer hybrid metamaterial for daytime radiative cooling" Science 2017, 355, 1062-1066.

Benkahoul, M. et al. "Thermochromic VO2 film deposited on Al with tunable thermal emissivity for space applications" Solar Energy Materials & Solar Cells 2011, 95, 3504-3508.

Kats, M. A. et al. "Vanadium dioxide as a natural disordered metamaterial: perfect thermal emission and large broadband negative differential thermal emittance" Phys. Rev. X 2013, 3, 041004, 1-7.

Ben-Abdallah, P. et al. "Contactless heat flux control with photonic devices" AIP Advances 2015, 5, 053502, 1-17.

Ben-Abdallah, P. et al. "Phase-change radiative thermal diode" Appl. Phys. Lett. 2013, 103, 191907, 1-4.

Ito, K. et al. "Experimental investigation of radiative thermal rectifier using vanadium dioxide" Appl. Phys. Lett. 2014 105, 253503, 1-5.

Fiorino, A. et al. "A thermal diode based on nanoscale thermal radiation" ACS Nano 2018, 12, 5774-5779.

Gao, Y. et al. "VO2-Sb:SnO2 composite thermochromic smart glass foil" Energy Environ. Sci. 2012, 5, 8234-8237.

Powell, M. J. et al. "Intelligent multifunctional VO2/SiO2/TiO2 coatings for self-cleaning, energy-saving window panels" Chem. Mater. 2016, 28,1369-1376.

Smith, G. et al. "Nanophotonics-enabled smart windows, buildings and wearables" Nanophotonics 2016, 5(1), 55-73.

Wang, H. et al. "Switchable wavelength-selective and diffuse metamaterial absorber/emitter with a phase transition spacer layer" Appl. Phys. Lett. 2014, 105, 071907, 1-5.

Taylor, S. et al. "Vanadium dioxide based Fabry-Perot emitter for dynamic radiative cooling applications" J. Quant. Spectrosc. Radiat Transfer 2017, 197, 76-83.

Burnett "Passive Radiative Cooling" Fall 2015; Coursework for PH240, Stanford University; 3 pages.

* cited by examiner

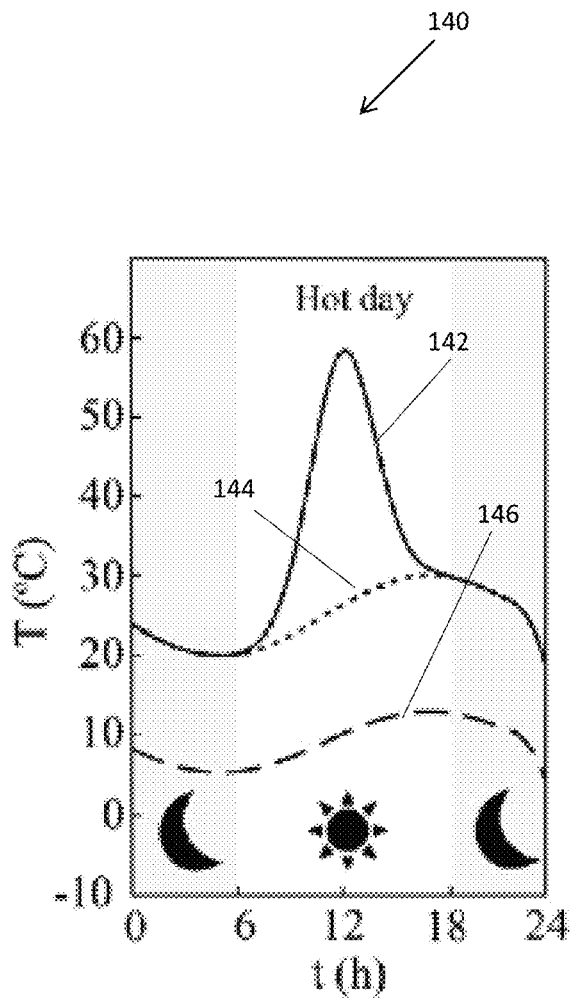
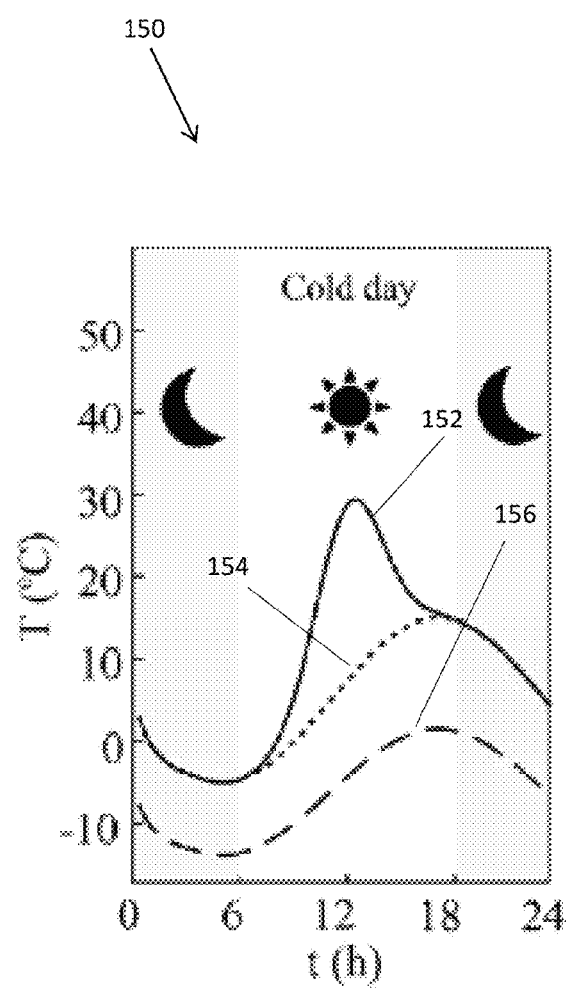
FIG. 1D
FIG. 1E

PASSIVE RADIATIVE THERMOSTAT

RELATED APPLICATIONS

This non-provisional application claims the benefit of priority in U.S. provisional application No. 62/844,909, filed May 8, 2019, and entitled "Passive Radiative Thermostat Enabled by Phase-Change Photonic Nanostructures," the entire content of which is incorporated herein by reference.

FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

TECHNICAL FIELD

The present disclosure relates generally to thermostats and in particular to radiative thermostats.

BACKGROUND

Passive radiative cooling uses the atmosphere's transparency windows in the mid-infrared (IR) to channel heat into outer space. This can serve as an efficient technique to radiatively cool building structures, renewable energy harvesting devices, and even textiles. Since ancient times, it has been known that a black radiator facing a clear night sky could cool below hot ambient temperatures. However, daytime passive radiative cooling below ambient temperature of a surface under direct sunlight poses much more stringent requirements due to heat absorption of solar radiation.

Only recently, high performance photonic structures that accomplish the foregoing goal have been theoretically proposed and experimentally realized. These include nanostructured multilayered coolers that simultaneously act as optimized solar reflectors and mid-IR thermal emitters, as well as randomized glass-polymer hybrid films that are transparent to the solar spectrum and also behave as good emitters across the atmospheric IR transparency windows.

On the other hand, heating via high solar absorption is sometimes a desirable feature, particularly in energy harvesting applications such as solar thermophotovoltaics. Various nanophotonic broadband solar absorbers have also been recently demonstrated based on metamaterials, dense nanorods and nanotube films, multilayer planar photonic structures, and refractory plasmonics.

Although both passive radiative coolers and solar absorption heaters offer clear advantages in the above technologies, they may also impose severe limitations to temperature management applications such as maintaining buildings at temperatures moderate enough for human occupancy or minimizing stress on structures due to thermal cycling. For example, even on a cold day a typical passive radiative cooler will still cool below ambient temperature, and even on a hot day a standard passive radiative heater will heat, possibly to undesirable or even unbearable high temperatures.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings:

FIGS. 1D and 1E are schematic temperature diagrams for two types of objects (the idealized emitter and the idealized absorber) during a hot day and during a cold day, respectively.

DETAILED DESCRIPTION

Figure 1A:
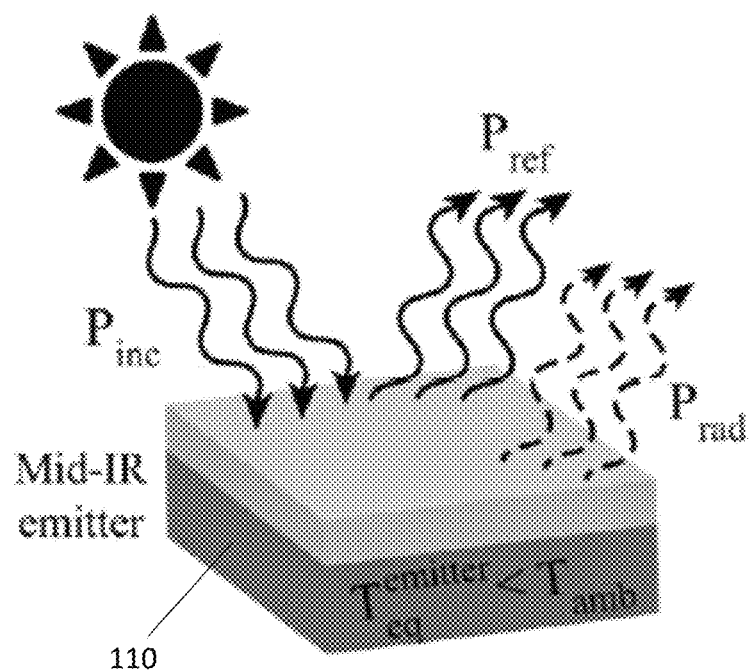
FIG. 1A a schematic representation of a mid-infrared (IR) emitter according to some embodiments.

Some embodiments provide a nanophotonic passive radiative thermostat (hereafter called PRT for brevity) that effectively monitors ambient temperature and self-adjust its emissivity and absorptivity across the visible to mid-IR wavelength range. The PRT may passively (i.e., without any external energy source) cool or heat in order to moderate the equilibrium temperature of a structure. The PRT may self-adjust its visible to mid-IR absorptivity and emissivity responses depending on ambient temperature. During daytime, it may use the sky to passively cool or heat using a phase-change transition temperature as a set point, and at nighttime it may maintain temperature at or below ambient temperature.

In at least some embodiments, a PRT may use phase-change photonic nanostructures for thermal regulation at or about room temperature. In at least some embodiments, a PRT may include one or more vanadium dioxide thin films that show daytime passive cooling with respect to ambient in hot days, and daytime passive heating with respect to ambient in cold days, maintaining an equilibrium temperature approximately locked within a phase transition region. PRTs may potentially enable novel thermal management technologies, for example, to moderate diurnal temperature in regions with extreme annual thermal swings.

To achieve the foregoing goal, generally, a PRT may be configured to reject solar radiation while increasing its mid-IR emissivity for temperatures above a preset threshold, hence operating as a cooler. On the other hand, for temperatures below the threshold, the PRT may behave as a heater by absorbing sunlight and minimizing heat losses via the atmospheric transparency windows. Various thermochromic phase change materials may be incorporated into a PRT for the purpose of realizing the foregoing absorption and emission properties. In various embodiments, thermochromic may refer to the property of temperature induced phase change between an optically transparent dielectric phase and an absorptive optically opaque metallic phase.

An example of a phase-change material that may be used in a PRT is vanadium dioxide ($VO_2$), which is a correlated electron transition metal oxide that exhibits a reversible first-order insulator-to-metal phase transition at the phase change temperature $T_{PC}^{VO_2} \approx 68°$ C. for bulk samples. For temperatures below the phase transition, $VO_2$ behaves as a narrow-gap semiconductor and it is transparent at IR wavelengths, while for temperatures above the phase transition, $VO_2$ is highly reflective due to its metallic character.

This switchable radiative response of $VO_2$ may be employed for manipulating thermal radiation in the near- and far-field regimes. This property may be utilized in the development of thermal diodes, transistors, and memories. $VO_2$ may also be used for temperature-modulated near-IR transmittance coatings for smart windows and tunable IR thermal emitters. These systems, however, are usually unable to cool below ambient temperature due to their inability to reject incident visible sunlight. Another disadvantage of bulk $VO_2$ is its high transition temperature (i.e., $T_{PC}^{VO_2} \approx 68°$ C.) that makes it impractical for thermal management at usual ambient conditions It is possible to tune $T_{PC}^{VO_2}$ over a wide range of temperatures by employing different approaches, including strain, pulsed voltage, doping, and nano-structuring. For example, phase transition temperatures as low as $T_{PC}^{VO_2} \approx 17°$ C. may be achieved in oriented $VO_2$ thin films on titanium dioxide ($TiO_2$) substrates. Alternatively, phase transition temperatures as low as $T_{PC}^{VO_2} \approx 20°$ C. may be achieved by doping $VO_2$ films with tungsten. Such doping may be accomplished by, for instance, sputtering of a high purity V-W alloy target with customized composition.

Such high degree of control over $T_{PC}^{VO_2}$ makes $VO_2$ a promising material to achieve passive temperature management under a variety of climate conditions.

A PRT may behave as a mid-IR emitter (thus a cooler) under some conditions and as a solar radiation absorber (thus a heater) under other conditions. To understand its general behavior, therefore, it is worth to analyze and contrast the behaviors of a mid-IR emitter and a solar absorber. FIGS. 1A-1E demonstrate a simplified model for an idealized mid-IR emitter (for brevity alternatively called here a mid-IR emitter or an emitter) and an idealized solar absorber (for brevity alternatively called here a solar absorber or an absorber) according to some embodiments.

Figure 1B:
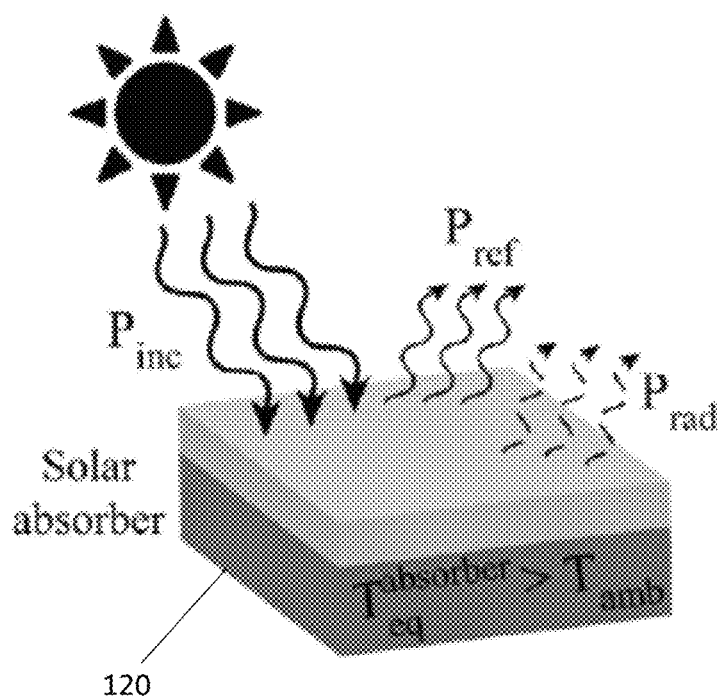
FIG. 1B is a schematic representation of a solar absorber according to some embodiments.
Figure 1C:
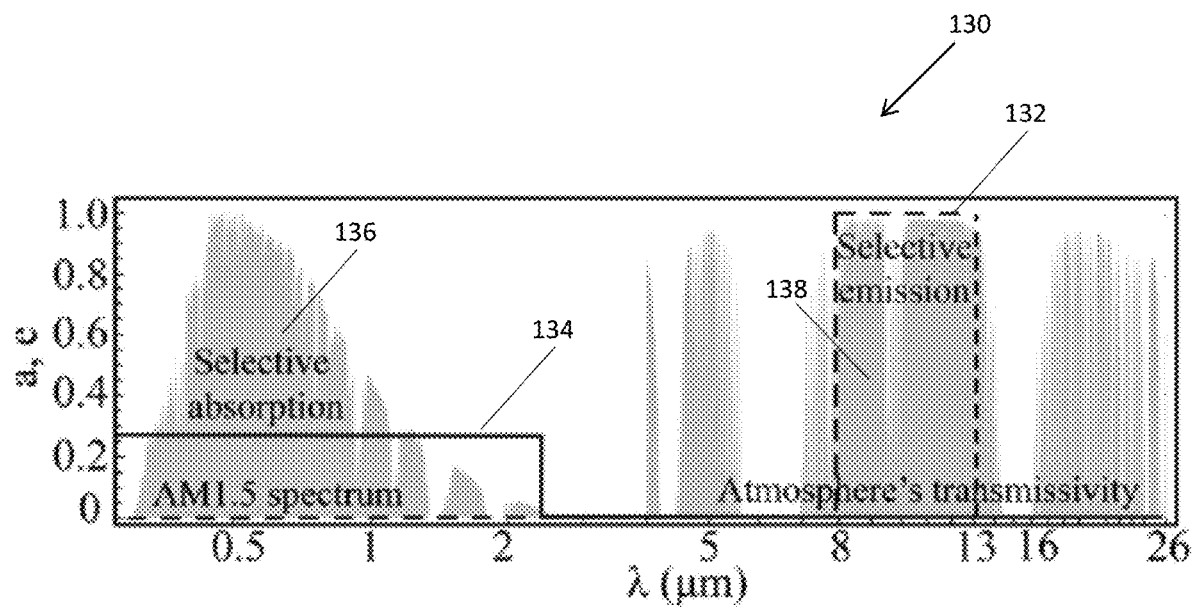
FIG. 1C is a graph set illustrating selective emissivity and absorptivity of the mid-IR emitter and the solar absorber, according to some embodiments.

In particular, FIG. 1A a schematic representation of a mid-infrared (IR) emitter 110, and FIG. 1B is a schematic representation of a solar absorber 120 according to some embodiments. FIG. 1C, on the other hand, is a graph-set 130 illustrating selective emissivity (absorptivity) of mid-IR emitter 110 (solar absorber 120), according to some embodiments.

In FIG. 1C, graph-set 130 includes a schematic graph 132 of the emissivity of mid-IR emitter 110 (broken line) and a schematic graph 134 of the absorptivity of solar absorber 120 (solid line). Moreover, graph-set 130 shows the AM1.5 solar spectrum 136 (the background grey shade in the wavelength range from about 0 micron (μm) to about 2.5 micron), and the first atmospheric transmissivity window 138 (the background grey shade in the wavelength range from about 8 micron to about 13 micron).

In FIG. 1C, graph 132 illustrates selective emissivity of mid-IR emitter 110, and graph 134 illustrates selective absorptivity of solar absorber 120. More specifically, in this simplified model, the mid-IR emitter has unit emissivity ($e(\lambda,\theta)=1$) within the first atmospheric transparency window (8 μm 13 μm) and zero emissivity ($e(\lambda,\theta)=0$) outside this wavelength range. Further, in this model, the solar absorber has a constant non-zero absorptivity ($0<a(\lambda,\theta)<1$) in the visible and near-IR range (0.3 μm≤λ≤2.5 μm) and zero absorptivity elsewhere.

In the simplified model, both $e(\lambda,\theta)$ and $a(\lambda,\theta)$ are considered independent of the direction into which radiation is emitted or from which radiation is absorbed. The net rate of the energy lost to the environment by an object (i.e., an emitter or an absorber) may be modelled as the algebraic sum of the rates of the energies lost through thermal radiation (e.g., mid-IR emission) ($+P_{rad}$), received by absorbing sun's radiation ($-P_{sun}$), received by absorbing atmospheric radiation ($-P_{atm}$), and received or lost by exchanging heat with its surroundings through thermal convection and conduction ($-P_{cc}$). From this model, the net power loss ($P_{net}(T)>0$) or gain ($P_{net}(T)<0$) may be calculated by Eq. 1 below.

$$P_{net}(T) = P_{rad}(T) - P_{sun} - P_{atm}(T_{amb}) - P_{cc}(T, T_{amb}). \quad \text{Eq. 1:}$$

In Eq. 1, T is the temperature of the object and $T_{amb}$ is the ambient temperature.

On the right-hand side of Eq. 1, the first term ($+P_{rad}$) represents the power of the thermal radiation emitted by the object, which may be calculated by Eq. 2 below.

$$P_{rad}(T) = A \int d\omega \, \cos(\theta) \int_0^\infty d\lambda I_{BB}(\lambda, T) e(\lambda, \theta). \quad \text{Eq. 2:}$$

In Eq. 2, the object is assumed to be a planar radiator (or absorber) of area A, the solid angle integral is over a hemisphere, and $I_{BB}(\lambda, T) = (2\pi \hbar c^2/\lambda^5)[e^{2\pi \hbar c/\lambda k_B T} - 1]^{-1}$ is the spectral radiance of a blackbody in thermal equilibrium at temperature T Here, $\hbar$ is the reduced Planck constant, c is the speed of light in vacuum, $k_B$ is the Boltzmann constant, and $\lambda$ is the wavelength of emitted or absorbed radiation.

The second term on the right-hand side Eq. 1 ($-P_{sun}$) represents the power of the radiation that the object absorbs from the sun and may be calculated by Eq. 3 below.

$$P_{sun} = A \cos(\theta_{sun}) \int_0^\infty d\lambda I_{AM1.5}(\lambda) a(\lambda, \theta_{sun}). \quad \text{Eq. 3:}$$

In Eq. 3, $I_{AM1.5}(\lambda)$ is the AM1.5 solar spectral radiance, and the object is assumed to be facing the sun at an angle $\theta_{sun}$.

The third term on the right-hand side Eq. 1 ($-P_{atm}$) represents the power of the radiation that the object absorbs from the atmosphere and may be calculated by Eq. 4 below.

$$P_{atm}(T_{amb}) = A \int d\omega \cos(\theta) \int_0^\infty d\lambda I_{BB}(\lambda, T_{amb}) a(\lambda, \theta) e_{atm}(\lambda, \theta). \quad \text{Eq. 4:}$$

In Eq. 4, $e_{atm}(\lambda, \theta) = 1 - t(\lambda)^{1/\cos(\theta)}$ is the angle-dependent emissivity of the atmosphere and $t(\lambda)$ corresponds to the atmospheric transmissivity in the zenith direction.

Finally, the last term on the right-hand side of Eq. 1 ($-P_{cc}$) represents non-radiative heat exchange between the object and its surroundings, i.e., via convection and conduction channels. This exchange may be calculated by Eq. 5 below.

$$P_{cc}(T, T_{amb}) = Ah(T_{amb} - T). \quad \text{Eq. 5:}$$

In Eq. 5, h is the heat coefficient and is assumed to be $\simeq 7$ W/m²·K throughout this disclosure, which is similar to that reported in literature. When $T_{amb} > T$, there is a power gained by the object ($-P_{cc} < 0$), while for $T_{amb} < T$ there is power lost from the object ($-P_{cc} > 0$).

From Eq. 1, one can find the equilibrium temperature ($T_{eq}$) of the object (i.e., the emitter or the absorber) by setting the net energy exchange to zero, as shown in Eq. 6 below.

$$P_{net}(T_{eq}) = 0. \quad \text{Eq. 6:}$$

As the ambient temperature $T_{amb}$ and solar irradiation conditions change during the day (in this disclosure meaning a full 24-hour day-and-night from 0 h to 24 h in FIGS. 1D and 1E, as distinguished from daytime, i.e., the period 6 h-18 h in those figures; the day is the union of the daytime and the nighttime) the equilibrium temperature $T_{eq}$ of the object, calculated from Eq. 6, will correspondingly vary, as explained below in relation to FIGS. 1D and 1E.

FIG. 1D is a schematic temperature diagram 140 for two types of objects (the idealized emitter and the idealized absorber) during a hot day. FIG. 1E, on the other hand, is a schematic temperature diagram 150 for the two types of objects during a cold day.

The three schematic graphs in each of diagrams 140 and 150 show variations of different temperatures measured in Celsius degrees (y-axis) as functions of time of the day (x-axis). In particular, diagram 140 includes a schematic graph 142 (solid curve) corresponding to the equilibrium temperature for the idealized absorber ($T_{eq}^{abs}$) during the hot day; a schematic graph 144 (short dashed curve) corresponding to the ambient temperature $T_{amb}$ during the hot day; and a schematic graph 146 (long dashed curve) corresponding to the equilibrium temperature for the idealized emitter ($T_{eq}^{emit}$) during the hot day. Similarly, diagram 150 includes a schematic graph 152 (solid curve) corresponding to the equilibrium temperature for the idealized absorber ($T_{eq}^{abs}$) during the cold day; a schematic graph 154 (short dashed curve) corresponding to the ambient temperature $T_{amb}$ during the cold day; and a schematic graph 156 (long dashed curve) corresponding to the equilibrium temperature for the idealized emitter ($T_{eq}^{emit}$) during the cold day. In these diagrams, thermal inertia was neglected, as it is assumed that the system reaches thermal equilibrium at time scales much shorter than those associated to relevant ambient temperature variations.

For deriving the schematic graphs in FIGS. 1D and 1E, the nonzero part of the absorptivity of the idealized absorber was chosen as a=0.25 and the non-zero part of the emissivity of the idealized emitter was chosen as e=1, as also depicted in FIG. 1C. Moreover, the time-dependent total solar irradiance was modeled using a Gaussian distribution between 6 h and 18 h (i.e., during daytime) with peak irradiance at noon of 900 W/m² and 600 W/m² in the hot and cold day, respectively.

Further, the ambient temperature profiles $T_{amb}$ (i.e., graphs 144 and 154) are modeled as sinusoidal functions, using Eq. 7 below.

$$T_{amb}(t) = T_{amb}^{avg} + \Delta T_{amb} \sin[2\pi(t(h) - 11)/24]. \quad \text{Eq. 7:}$$

with $T_{amb}^{avg} = 25°$ C. and $\Delta T_{amb} = 5°$ C., for graph 144 in FIG. 1D (the hot day); and $T_{amb}^{avg} = 5°$ C. and $\Delta T_{amb} = 10°$ C., for graph 154 in FIG. 1E (the cold day). The equilibrium temperature graphs for the two types of objects (i.e. graphs 142, 146, 154, and 156) were derived based on the above assumptions and using Eqs. 1-6 above.

FIGS. 1D and 1E show some expected behavior by the two objects. In particular, considering the emitter temperature for both the hot day (graph 146) and the cold day (graph 156), it falls below $T_{amb}$ during both the daytime and the nighttime. Considering the absorber temperature, on the other hand, for both the hot day (graph 142) and the cold day (graph 152), it rises above $T_{amb}$ during daytime and thermalizes at the ambient temperature during nighttime, when $P_{sun}$ in Eq. 1 is zero.

As is illustrated in FIGS. 1D and 1E, each of the two objects shows some undesirable behavior at least during some periods of time in the hot day or in the cold day. For example, during the hot day, while the emitter temperature (146) is desirably below the ambient temperature, the absorber temperature (graph 142) rises well above the already hot $T_{amb}$ during the hot daytime. During the cold day, on the other hand, while the absorber temperature desirably rises above $T_{amb}$ during the daytime (graph 152) and does not fall below it otherwise, the emitter temperature is undesirably below the already cold $T_{amb}$ throughout the day (graph 156).

As detailed below, the PRTs of some embodiments are able to maintain the above desirable behaviors while avoiding the undesirable behaviors. To that end, some embodiments use materials whose emissivity and absorptivity characteristics are affected by the ambient temperature and, thereby, effectively behave as coolers on hot days and as heaters on cold days.

Some embodiments utilize a PRT as explained here. Such a PRT, in an idealized version, may include a material that behaves as a solar absorber for temperatures below a phase transition temperature $T_{PC}$, and as a mid-IR emitter for temperatures above $T_{PC}$. In some embodiments, therefore, both $P_{sun}$ and $P_{atm}$ in Eq. 1 may depend on the temperature of the PRT (T) through the temperature-dependent absorptivity $a_T(\lambda, \theta)$, while $P_{rad}$ in Eq. 1 may have an additional temperature dependence through the emissivity $e_T(\lambda, \theta)$.

Accordingly, the PRT may change its behavior depending on the relation between the ambient temperature $T_{amb}$ and the phase transition temperature $T_{PC}$. FIGS. 2A-2D depict this dependency.

Figure 2A:
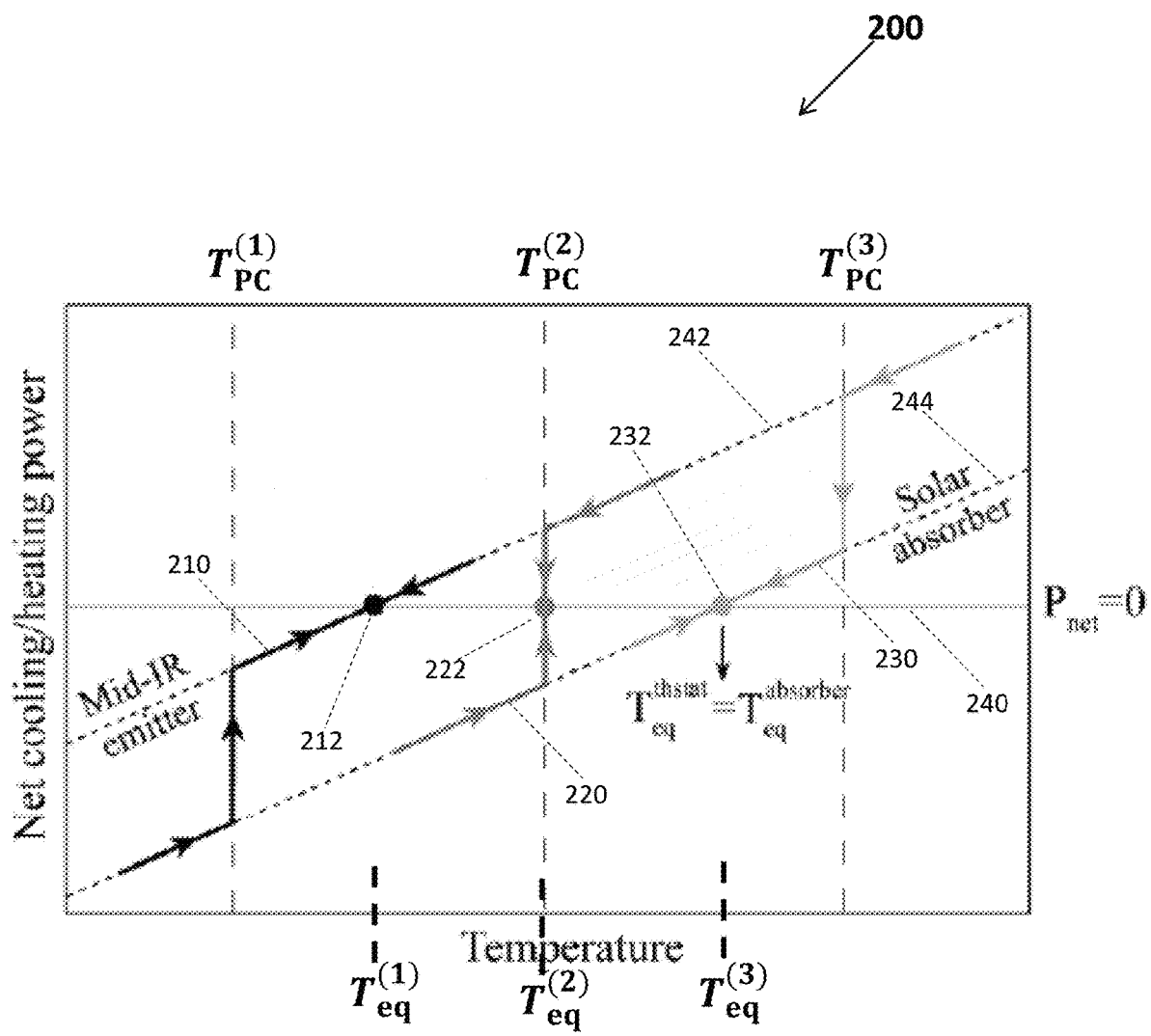
FIG. 2A is a plot-set that depicts the dependence of the equilibrium temperature of a phase-change photonic thermostat on its phase transition temperature according to some embodiments.

In particular, FIG. 2A shows a plot-set 200 that depicts the dependence of the equilibrium temperature of a PRT on its phase transition temperature according to some embodiments. In particular, the plots in plot-set 200 illustrate the temperature dependence of the net cooling/heating power at an arbitrary time of the day, for three PRTs with three different phase-transition temperatures according to some embodiments. More specifically, plot-set 200 shows the net power loss $P_{net}(T)$ of the PRT as a function of T (the temperature of the PRT) for a first PRT with a first phase transition temperature $T_{PC}^{(1)}$ (the black plot 210), a second PRT with a second phase transition temperature $T_{PC}^{(2)}$ (the dark gray plot 220), and a third PRT with a third phase transition temperature $T_{PC}^{(3)}$ (the light gray plot 230). The values of the three phase transition temperatures are marked by the long dashed vertical lines and labelled accordingly ($T_{PC}^{(1)}$, $T_{PC}^{(2)}$, and $T_{PC}^{(3)}$).

A PRT may behave as a solar absorber at some temperatures and as a mid-IR emitter at other temperatures. To illustrate this change of behavior, plot-set 200 also includes slanted short-dashed lines 242 and 244, which are respectively the net power loss plot for the idealized emitter of FIG. 1A and the idealized absorber of FIG. 1B. Around room temperature, the curves are well approximated as linear functions of temperature. As shown, when the temperature T for the $i^{th}$ PRT is below the phase transition temperature TPS for that PRT, it behaves as a solar absorber (thus overlapping with idealized solar absorber plot 244) and, inversely, when the temperature T for the $i^{th}$ PRT is above the phase transition temperature $T_{PC}^{(i)}$ for that PRT, it behaves as a mid-IR emitter (thus overlapping with idealized mid-IR emitter plot 242). The vertical jumps in each plot indicates the phase transition of the PRT (at $T=T_{PC}^{(i)}$) between behaving as an emitter and behaving as an absorber.

As explained before, each PRT equilibrates to an equilibrium temperature at which the net power exchange is zero. The horizontal middle line (solid gray line 240, called equilibrium line) marks the zero net power loss ($P_{net}(T)=0$). As explained above, the zero cross sections of the plots 210, 220, and 230 (i.e., their cross sections with equilibrium line 240), which are equilibrium points 212, 222, and 232, mark the equilibrium temperatures ($T_{eq}^{(1)}$, $T_{eq}^{(2)}$, and $T_{eq}^{(3)}$) of the three PRTs.

More specifically, as the arrows super-imposed on each plot indicate, when the $P_{net}$ of a PRT is below equilibrium line 240, the PRT heats up; and, inversely, when the $P_{net}$ of a PRT is above this line, the PRT cools down. Therefore, whether the $i^{th}$ PRT starts above or below its equilibrium temperature $T_{eq}^{(i)}$, its temperature T tends toward that equilibrium temperature. Noteworthy is that equilibrium points 212 and 232 (marking $T_{eq}^{(1)}$ and $T_{eq}^{(3)}$) are also zero cross sections emitter's power plot 242 and absorber's power plot 244. Therefore, $T_{eq}^{(1)}=T_{eq}^{emit}<T_{amb}$ and $T_{eq}^{(3)}=T_{eq}^{abs}>T_{amb}$ (the inequalities discussed in relation to FIGS. 1D and 1E). For the second PRT, on the other hand, $T_{eq}^{(2)}=T_{PC}^{(2)}$. Moreover, this analysis indicates that using the phase-change material enables the PRT to operate in a negative feedback loop and maintain its temperature within a target range.

The above results can be generalized by deriving the following three rules for the equilibrium temperature of a PRT ($T_{eq}^{PRT}$) based on the relation between its phase transition temperature ($T_{PC}$) and the two equilibrium temperatures ($T_{eq}^{emit}$ and $T_{eq}^{abs}$):

(i) If $T_{PC}<T_{eq}^{emit}$, then $T_{eq}^{PRT}=T_{eq}^{emit}<T_{amb}$
(ii) If $T_{eq}^{emit}<T_{PC}<T_{eq}^{abs}$, then $T_{eq}^{PRT}=T_{PC}$
(iii) If $T_{PC}>T_{eq}^{abs}$, then $T_{eq}^{PRT}=T_{eq}^{abs}>T_{amb}$ All rules result from the facts that the power plot for a PRT overlaps the absorber plot (here plot 244) at temperatures below $T_{PC}^{(i)}$; overlaps the emitter plot (here plot 242) at temperatures above $T_{PC}^{(i)}$, and that $T_{eq}^{emit}<T_{eq}^{abs}$. Therefore, under the condition of rule (i) (i.e., if $T_{PC}^{(i)}<T_{eq}^{emit}$, for which an example is the first PRT with power plot 210), the power plot crosses the equilibrium line (line 240) where the emitter plot does (i.e., at $T=T_{eq}^{emit}$). Under the condition of rule (iii), on the other hand, (i.e., if $T_{PC}^{(i)}>T_{eq}^{abs}$, for which an example is the third PRT with power plot 230), the power plot crosses the equilibrium line (line 240) where the absorber plot does (i.e., at $T=T_{eq}^{abs}$). Finally, under the condition of rule (ii) (i.e., if $T_{eq}^{emit}<T_{PC}^{(i)}<T_{eq}^{abs}$, for which an example is the second PRT with power plot 220), the power plot crosses the equilibrium line (line 240 at the phase transition temperature and therefore $T_{eq}^{(i)}=T_{PC}^{(i)}$.

Rules (i)-(iii) were derived independent of the ambient temperature $T_{amb}$ and therefore apply to any temperature, and to both daytime and nighttime. Specifically, a change in $T_{amb}$ would only shift up or down the location of equilibrium line 240, which did not enter the derivation of the rules. But, as explained in relation to FIGS. 1D and 1E, a change in $T_{amb}$ or a transition between daytime and nighttime does change $T_{eq}^{emit}$ (according to graphs 146 and 156) and $T_{eq}^{abs}$ (according to graphs 142 and 152), which then may change the rule that applies at the time.

Figures 2B, 2C, 2D:
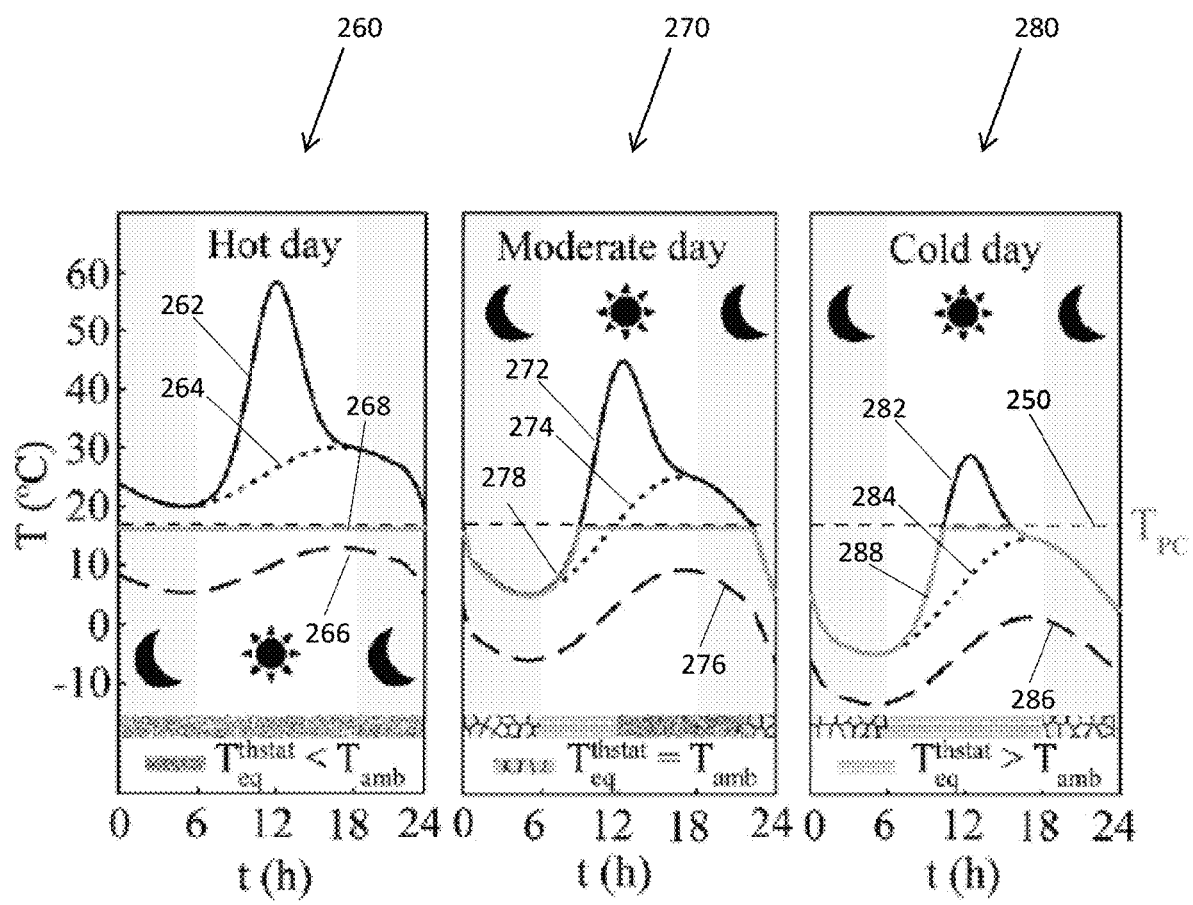
FIGS. 2B-2D illustrate the behavior of a passive radiative thermostat (PRT) at different temperatures and at different times of different days, according to some embodiments.

FIGS. 2B-2D illustrate the behavior of a PRT at different temperatures and at different times of different days, according to some embodiments. As further explained below, these figures illustrate that the PRT can show the cooling effect of the idealized mid-IR emitter or the heating effect of the idealized solar absorber at times that each effect is desirable but avoid those effects when they are undesirable.

FIGS. 2B-2D show schematic temperature diagrams for three types of objects (the idealized emitter, the idealized absorber, and the PRT) during three days with different types of temperature profiles. In particular, FIG. 2B shows a schematic diagram 260 for the objects in a hot day, FIG. 2C shows a schematic diagram 270 for the objects in a moderate day, and FIG. 2D shows a schematic diagram 280 for the objects in a cold day. Each diagram includes a schematic graph for $T_{eq}^{abs}$, the equilibrium temperature of the absorber (graphs 262, 272, and 282), a schematic graph for $T_{amb}$, the ambient temperature (graphs 264, 274, and 284), a schematic graph for $T_{eq}^{emit}$, the equilibrium temperature of the emitter (graphs 266, 276, and 286), and a schematic graph for $T_{eq}^{PRT}$, the equilibrium temperature of the PRT (graphs 268, 278, and 288, all grey). Moreover, the horizontal dashed line 250 shows the value of the phase transition temperature $T_{PC}$ for the PRT (in this exemplary embodiment $T_{PC}=17°$ C.).

The ambient temperature profiles $T_{amb}$ are again modeled as sinusoidal functions, using Eq. 7, with $T_{amb}^{avg}=25°$ C. and $\Delta T_{amb}=5°$ C., for graph 264 in FIG. 2B (the hot day); $T_{amb}^{avg}=15°$ C. and $\Delta T_{amb}=10°$ C., for graph 274 in FIG. 2C (the moderate day); and $T_{amb}^{avg}=5°$ C. and $\Delta T_{amb}=10°$ C., for graph 284 in FIG. 2D (the cold day). In each diagram, the absorber graph (i.e., graphs 262, 272, and 282), and the emitter graph (i.e., graphs 266, 276, and 286), are derived from Eq. 6 in the manner described for their counterparts in FIGS. 1D and 1E and also behave in the same manner.

The PRT graphs (i.e., graphs 268, 278, and 288), on the other hand, are derived from rules (i)-(iii). Accordingly, the PRT graphs are divided into multiple sections as follows. PRT graph 268 (for the hot day) has one section, a flat horizontal section (overlapping $T_{pc}$ line 250 throughout the day). PRT graph 278 (for the moderate day) has three sections, a left section (overlapping absorber graph 272 for early hours of the day), a middle section (the flat horizontal section, overlapping $T_{PC}$ line 250 for the middle hours of the day), and a right section (overlapping absorber graph 272 for late hours of the day). Similarly, PRT graph 288 (for the cold day) has three sections, a left section (overlapping absorber graph 272 for early hours of the day), a middle section (the flat horizontal section, overlapping $T_{PC}$ line 250 for the middle hours of the day), and a right section (overlapping absorber graph 272 for late hours of the day). More specifically, these sections can be divided into three subsets, each formed based on one of rules (i)-(iii) above, as follows.

(I) Based on rule (i), whenever the $T_{PC}$ line 250 falls below the emitter graph, then the corresponding section of the PRT graph overlaps the emitter graph. This never happens in the diagrams of FIGS. 1B-1D, but in principle could happen, e.g., in a very hot day or for a lower $T_{PC}$, in which case the emitter temperature may exceed the phase transition temperature $T_{PC}$, at least some times.

(II) Based on rule (ii), whenever the $T_{PC}$ line 250 falls between the emitter graph and the absorber graph, then the corresponding section of the PRT graph overlaps the $T_{PC}$ line 250. This happens in all of graph 268, and in the middle sections of graphs 278 and 288.

(III) Based on rule (iii), whenever the $T_{PC}$ line 250 falls above the absorber graph, then the corresponding part of the PRT graph overlaps the absorber graph. This happens in the left and right sections of graphs 278 and 288.

Therefore, if the $T_{PC}$ is selected appropriately, the PRT can maintain equilibrium temperatures that are desirable at a diverse set of conditions. For instance, the exemplary PRT of FIGS. 2B-2D, by having a $T_{PC}=17°$ C., remains at the moderate equilibrium temperature of 17° C.=63° F. at times that the absorber gets uncomfortably hot (e.g., around midday on the hot and moderate days, when the equilibrium temperature of the absorber reaches 60° C.=140° F.) or at times that the emitter gets uncomfortably cold (e.g., around early morning on the moderate and cold days, when the equilibrium temperature of the emitter reaches −10° C.=14° F.).

From another point of view, the PRT acts as a radiative cooler (similar to the emitter) or as a radiative heater (similar to the absorber) at some desirable times. Specifically, the PRT acts as a radiative cooler whenever its temperature (graph 268, 278, or 288) falls below the ambient temperature (graph 264, 274, or 284). This happens, desirably, at some times that the weather is too hot, i.e., on the hot day throughout the day, or on the moderate day from around midday to around 22 h.

Inversely, the PRT acts as a radiative heater whenever its temperature (graph 268, 278, or 288) falls above the ambient temperature (graph 264, 274, or 284). This happens, desirably, at some times that the weather is too cold (and the sun is out, enabling solar absorption), i.e., on the moderate day from around 7 h to around midday, or more importantly, on the cold day throughout the daytime, from around 6 h to around 17 h.

So, during the hot day depicted in FIG. 2B, the PRT operates as a radiative cooler throughout the day. During the moderate day depicted in FIG. 2C, the PRT operates as a heater between in the morning (around 7 h-12 h), and as a cooler between around 12 h (midday) to around 22 h. Finally, during the cold day depicted in FIG. 2C, the PRT acts as a heater almost throughout daytime, i.e., between 6 h and 18 h.

Considering the desirable behavior of the PRT, various embodiments utilize different designs and materials for manufacturing the PRT. In particular, in some embodiments, manufacturing the PRT may require using a thermochromic material that has its phase transition temperature around the desired working temperature of the PRT. For example, vanadium dioxide ($VO_2$) may be considered a good candidate as a thermochromic material. $VO_2$ has the desired property that its phase transition temperature can be tuned over a wide range of temperatures through doping, strain, or nanostructuring. This property enables the use of $VO_2$ for temperature moderation in different environment settings.

Moreover, manufacturing the PRT may require using the design or the materials such that the absorptivity (=emissivity according to Kirchhoff s law) in the dielectric and metallic phases of the thermochromic material are as different as possible, thereby enhancing the contrast between heating and cooling operation modes. For example, to achieve this distinction, in some embodiments the PRT includes a nanostructure in the form of a multilayered stack. The stack may have a basic platform including a metallic bottom layer, a dielectric spacer, and a top thermochromic layer.

The design and the materials may be selected to achieve the desired absorptivity and emissivity response. In particular, the PRT may generally include two parts: (1) a phase-change part composed of a thermochromic material that passively switches its optical response depending on temperature, and (2) a wavelength-selector part whose materials or designs may be such that cavity (Fabry-Perot) resonances or plasmonic resonances are created at desired wavelengths. Based on the basic platform, various embodiments may use one of the following two sub-designs.

In a first sub-design based on a multilayered stack nanostructure (MLSN), the phase-change part is manufactured in the form of the thermochromic layer composed of a continuous film. Moreover, the wavelength-selector part is provided in the form of the combination of a dielectric spacer and the thermochromic film. To perform as the wavelength-selector part, the widths of the dielectric spacer and the thermochromic film may be selected so as to form an electromagnetic cavity resonator, enabling electromagnetic cavity resonances in the mid-infrared range when $VO_2$ is in the metallic phase.

In a second sub-design based on a few-layer metasurface nanostructure (FLMN), the phase change part includes a thermochromic layer manufactured into a periodic array of resonators. In this sub-design, the geometrical sizes of the thermochromic resonators and the thicknesses of the dielectric layers are chosen to enable electromagnetic plasmonic resonances in the mid-IR range, when $VO_2$ is in the metallic phase. The resonators and the layers, therefore, play the role of the wavelength-selector part. Different thermochromic resonator designs are possible, including L-shaped resonators (discussed later in relation to FIG. 5A), split-rings, rectangular patches, disks, and crosses.

Figure 3:
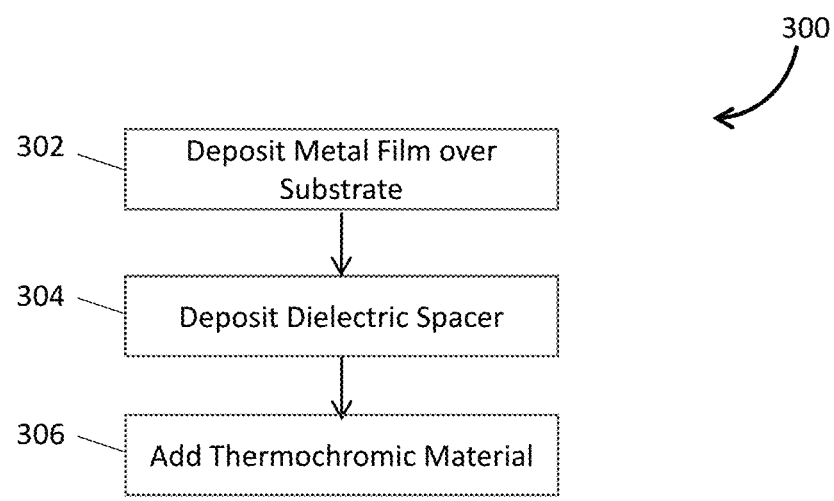
FIG. 3 shows a flowchart for a manufacturing process according to some embodiments.

FIG. 3 shows a flowchart 300 for the above-mentioned manufacturing process according to some embodiments.

In step 302, a metal film is deposited over a substrate. The substrate may be silica glass (i.e., crystalline silicon dioxide, $SiO_2$), fused silica (i.e., amorphous non crystalline $SiO_2$) or silicon (Si), among others. Further, the metal film may be made of aluminum (Al), gold (Au), or silver (Ag). In some embodiments, the metal film may be selected to prevent transmission through the entire wavelengths of interest (visible to mid-IR) and minimize absorption in the visible range. The deposition may use electron-beam deposition, thermal deposition, sputtering, spray paint techniques, or atomic-layer deposition.

In step 304, a dielectric spacer layer is deposited over the metal film. The dielectric may be silicon dioxide ($SiO_2$), aluminum oxide ($Al_2O_3$), titanium dioxide ($TiO_2$), zinc sulfide (ZnS), or zinc selenide (ZnSe). The dielectric spacer material may be selected to be transparent from the visible to the mid-IR wavelength spectrum for the MLSN design, so as to minimize absorption and enable Fabry-Perot resonances. For the FLMN design, the dielectric spacer may be selected to be transparent in the visible and near-IR, but it may have bulk phonon polariton resonances in the mid-IR to increase emissivity. The deposition technique may be sputtering, atomic layer deposition, etc.

In step 306, a thermochromic material is added to the previous layer. The thermochromic material may be $VO_2$ with a tuned $T_{PC}^{VO_2}$ as explained above. Other alternative thermochromic materials are samarium nickelate ($SmNiO_3$) and germanium-antimony-tellurium (GeSbTe, also known as GST). The deposition may use, e.g., magnetron sputtering and chemical solution techniques.

For the first sub-design, explained above, in step 306 the thermochromic material may be added through depositing a film of that material over the dielectric spacer layer. The deposition may use, e.g., magnetron sputtering and chemical solution techniques.

For the second sub-design, also explained above, in step 306 the thermochromic material may be added as a continuous film and thermochromic resonators may then be fabricated using wet/dry etching. Alternatively, instead of first depositing a continuous thermochromic film, thermochromic resonators may be directly fabricated on the dielectric spacer using lithography and liftoff techniques.

In some embodiments using $VO_2$, because $VO_2$ films can adopt a large number of stable species, it may be challenging to make a film with the desired thermochromic properties. To attain optimal performance, $VO_2$ films may be thermally annealed in a $N_2$ environment to achieve proper composition and crystallization. Various annealing protocols may be analyzed to determine suitable heat treatment conditions for optimal sample composition. Fabricated films may be structurally, morphologically, and optically characterized using X-ray diffraction, atomic force microscopy, and ellipsometry, respectively.

Additionally, an ultrathin protective layer (e.g., $SiO_2$) may be used for passivation of the $VO_2$ films, preventing degradation into unfavorable species (e.g., $V_2O_3$, $V_2O_5$) due to oxidation.

Moreover, a reflective film may be applied over the top layer to mitigate the inherent optical absorption within the solar spectrum by the back metal. Such an absorption may inhibit the cooling capacity of the whole structure in hot environments. The reflective film may be a dielectric stack film that is highly reflective at visible wavelengths but transparent in the infrared. This addition may reduce solar absorption and allow effective cooling in hot days, while still keeping the heating capabilities of the sample in cold seasons.

Figure 4A:
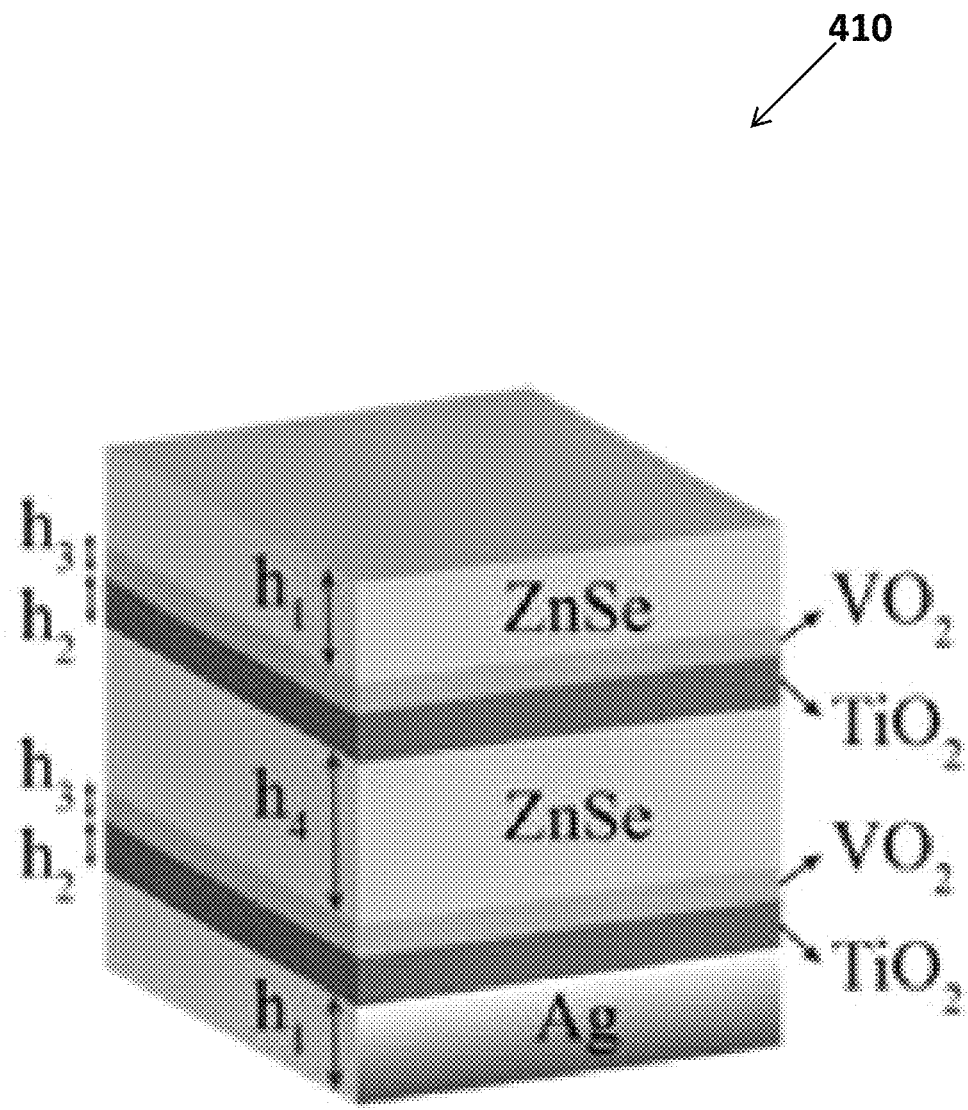
FIG. 4A shows a PRT having a first sub-design based on a multilayered stack nanostructure according to an embodiment.

The above processes may be used to manufacture PRTs of various types and designs. FIG. 4A shows a MLSN PRT 410 having the first sub-design according to an embodiment. In some embodiments, the PRT 410 may be a multilayer photonic nanostructure assembly, designed for passive temperature management.

PRT 410 includes a $VO_2$-based MLSN that presents absorption and emission properties qualitatively similar to those introduced in the simplified model above. It includes a ground plane made of a metallic layer that may prevent transmission over the entire wavelength range of interest. The makeup of the ground plane may vary in various embodiments. In at least some embodiments, the ground plane may include one or more of Ag, Au, Al, or the like.

PRT 410 may also include alternating layers of materials. The alternating layers of materials may be selected based on desired emission and absorption features. In at least some embodiments, the multilayer stack may include alternating layers of $TiO_2$, $VO_2$, and ZnSe, as seen in 410.

As illustrated in FIG. 4A, in the MLSN of 410, thicknesses $h_1$=about 300 nm, $h_2$=about 55 nm, $h_3$=about 30 nm, and $h_4$=about 1 µm. In various embodiments, these dimensions may be set to other values. For example, $h_3$ may be about 30 nm or less, and $h_4$ may be about 900 nm to about 1.1 microns.

Moreover, while FIG. 4A illustrates the use of $TiO_2$ and ZnSe as dielectric spacer layers, one or more of those layers in FIG. 4A may be replaced with one or more other dielectric substrates. In at least some embodiments, $TiO_2$ or ZnSe may be replaced with $Al_2O_3$, $SiO_2$, some other like compound, or a combination thereof.

Further, one or more of the $VO_2$ layers in FIG. 4A may be replaced with one or more other thermochromic materials. In at least some embodiments, $VO_2$ may be replaced with $SmNiO_3$, GeSbTe, or some other like compound, or a combination thereof. As with bulk $VO_2$, it may be possible to change the transition temperature of the foregoing materials by doping or other means.

In the following, $T_{PC}^{VO_2}$ was fixed to 17° C., consistent with phase-transition temperatures reported in the literature for 30 nm thick $VO_2$ thin films on $TiO_2$. Such $T_{PC}^{VO_2}$ results in operating conditions within the typical ambient temperature variations occurring in Los Alamos, N. Mex. It is assumed that the heating and cooling lags associated with $VO_2$ hysteresis occurs at close temperatures, and therefore main conclusions remain unaffected. Later in this disclosure, it is discussed how material hysteresis may modify the PRT's equilibrium temperature shown in FIGS. 2A-2D. As the insulator-to-metal phase transition of $VO_2$ may occur on a time scale of a few tens of femtoseconds, it may be assumed that the PRT reacts instantaneously to ambient temperature variations that occur at much longer time scales.

Figure 4B:
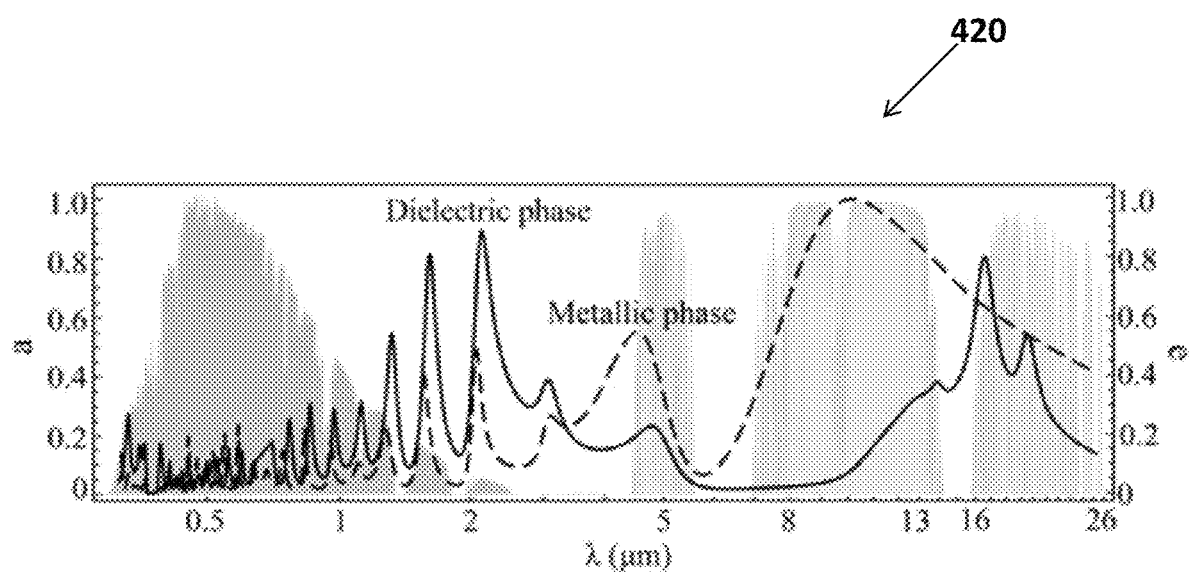
FIG. 4B shows a graph-set illustrating calculated absorptivity and emissivity of a multilayer stack nanostructure in accordance with some embodiments.

FIG. 4B shows a graph-set 420 illustrating calculated absorptivity (=emissivity per Kirchhoff's law) of the multilayer photonic nanostructure of FIG. 4A versus wavelength for $VO_2$ in the dielectric (solid curve) and metallic (dashed curve) phases for unpolarized radiation, in accordance with some embodiments. The absorptivity was calculated using the transfer matrix method with a=1−r, where r is the multilayer's reflectivity for unpolarized radiation. The temperature-dependent refractive index of $VO_2$ was modeled via the Bruggeman effective medium theory for metallic puddles. One used parameter was a filling factor f ($0 \le f \le 1$), which gives the volumetric fraction of metallic puddles embedded in the dielectric host of the thermochromic material: f=1 when the thermochromic material is fully in its metallic phase (metallic puddles occupy the whole material), and f=0 when the thermochromic material is fully in its dielectric phase (and there are no metallic puddles).

More specifically, graph-set 420 shows the absorptivity and emissivity at the normal direction for $VO_2$ in its dielectric (solid curve) and metallic (dashed curve) phases. When $VO_2$ is in the purely dielectric phase (f=0) a strong impedance mismatch at the air-multilayer interface results in decreased absorptivity in the 8 µm$\le \lambda \le$13 µm range. The emissivity increases near the edge of the first atmospheric transparency window ($\lambda$~13 µm) due to enhanced absorption in the $TiO_2$ film, and two peaks emerge at ~17 µm and ~20

μm near the phonon modes of $VO_2$. In the visible and the near-IR wavelength range, the absorption takes place in the $VO_2$ films, resulting in solar spectrum weighted absorptivity of about 15% for normal incidence.

When, on the other hand, the $VO_2$ thin films are in the purely metallic phase (f=1), they form a good quality mid-IR Fabry-Perot cavity with the fundamental mode resonating at $\lambda \approx 10$ μm, which leads to near unity emissivity at this wavelength. Noteworthy is that an additional cooling channel may be possible in the herein disclosed PRT due to the nonzero emission in the atmospheric transparency window between 20 μm≤λ≤25 μm. In the visible and the near-IR wavelength range, the absorption also takes place in the $VO_2$ films, but results in a solar spectrum weighted absorptivity of about 6%.

Figure 4C:
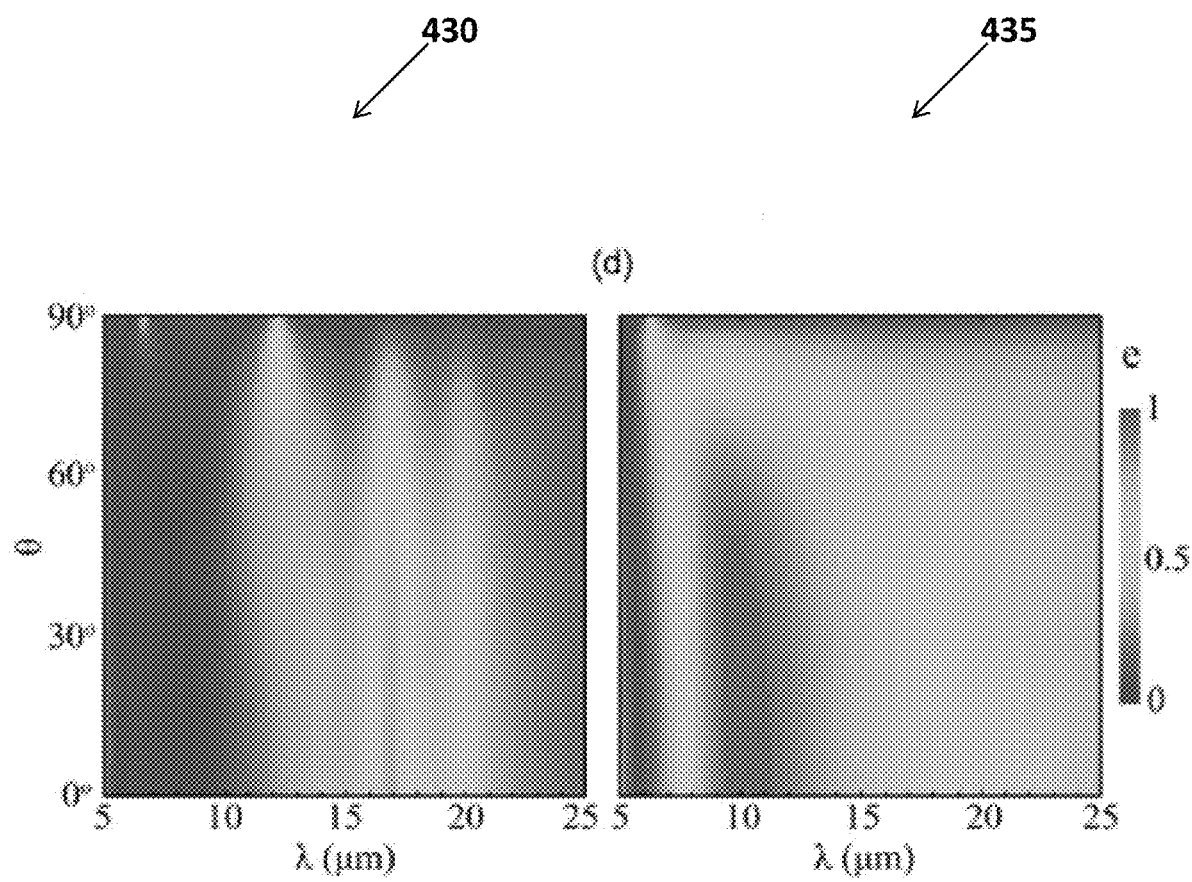
FIG. 4C shows two diagrams depicting the thermostat's emissivity dependence over the direction of emission in its two phases according to some embodiments.

FIG. 4C shows two diagrams depicting the PRT's emissivity dependence over the direction of emission in its two phases according to some embodiments. In particular, emissivity diagram 430 illustrates the dependence of emissivity of the MLSN of FIG. 4A on the polar angle at mid-IR wavelengths for the dielectric phase of $VO_2$. Emissivity diagram 435, on the other hand, illustrates the dependence of emissivity of the MLSN of FIG. 4A on the polar angle at mid-IR wavelengths for the metallic phase of $VO_2$. As seen, in each diagram, the value of the emissivity (depicted in gray scale) rarely changes in the vertical direction, which is the axis for the polar angle. Therefore, the diagrams demonstrate a strong robustness against variations of the direction.

Figure 4D:
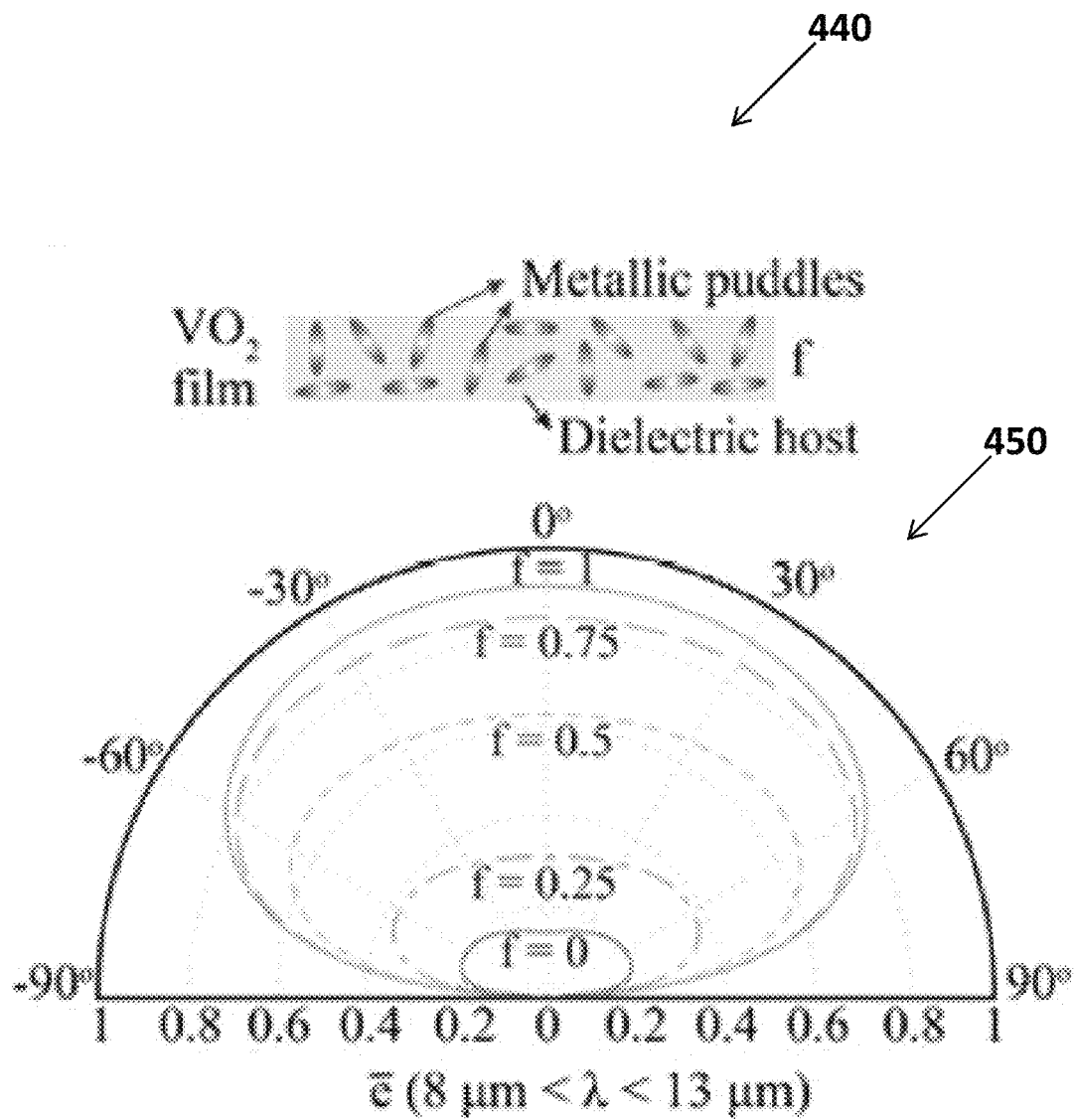
FIG. 4D illustrates a schematic of $VO_2$ puddles and the angular dependence diagram for the average emissivity, in accordance with some embodiments.

FIG. 4D illustrates a schematic 440 of $VO_2$ puddles (filling factor f) in a $VO_2$ dielectric host and angular dependence diagram 450 for the average emissivity in the first atmospheric transparency window (8μ≤λ≤13 μm) across the phase transitions for several filling factors, in accordance with some embodiments.

In particular, diagram 440 shows a simple model of a $VO_2$ film that can undergo an insulator-to-metal phase transition. In this model the film is composed of metallic puddles embedded in a dielectric host medium. The volumetric occupation of the puddles is given by a temperature-dependent filling factor f=f (T). For temperatures much smaller than the $VO_2$ phase transition temperature $T \ll T_{PC}^{VO_2}$ the filling factor is f=0, meaning that no metallic puddles are present and hence the $VO_2$ film is in the dielectric phase. For temperatures much larger than the $VO_2$ phase transition temperature $T \gg T_{PC}^{VO_2}$ the filling factor is f=1, meaning that the whole film is occupied by the metallic puddles and hence the $VO_2$ film is in the metallic phase.

Further, diagram 450 shows polar plots of the average emissivity in the first transparency window. Diagram 450 highlights the quasi-omnidirectional emissivity of the PRT at various representative stages of the phase transition. At visible and near-IR wavelengths the absorption in the PRT takes place in the $VO_2$ thin films, and a small difference can be noticed between the dielectric and metallic phases as a consequence of the weak effect of the phase transition of $VO_2$ at short wavelengths. The solar spectrum weighted average absorptivity of the PRT at normal incidence is ~15% for the dielectric phase and ~6% for the metallic phase, which is sufficient to empower a PRT with desired properties to perform passive temperature regulation.

Figure 5A:
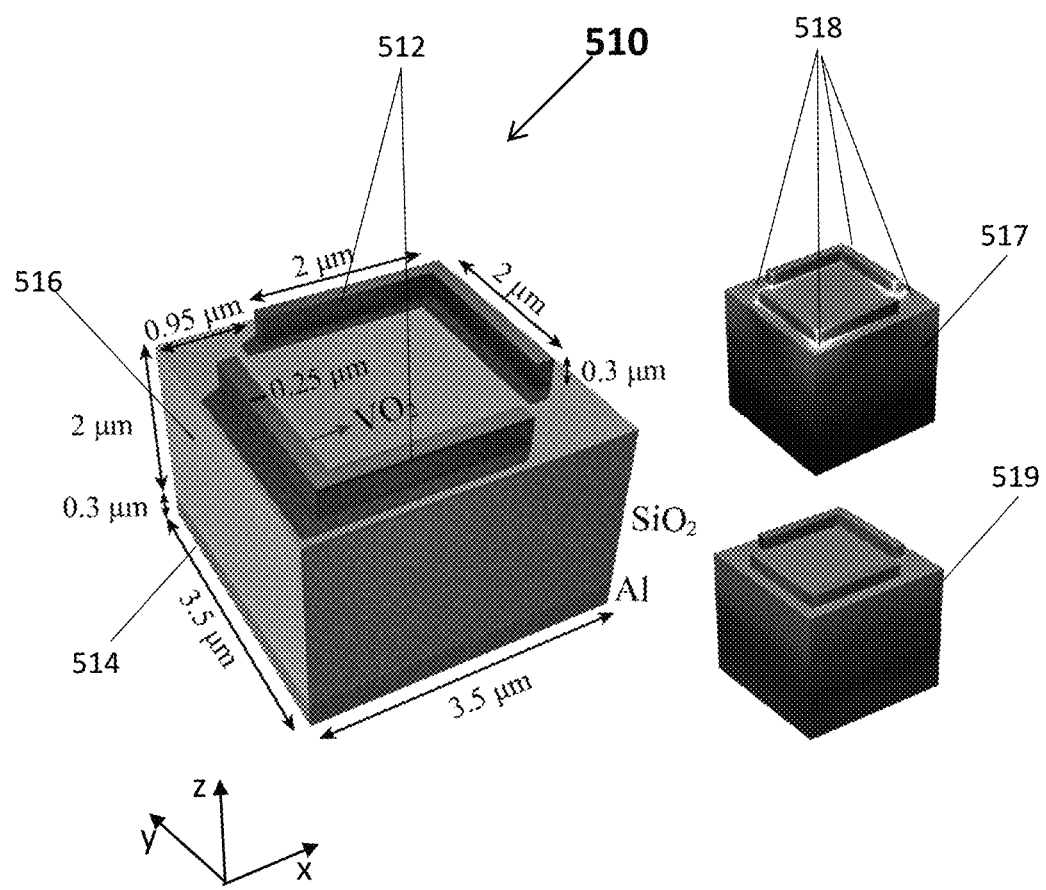
FIG. 5A shows a unit cell for a PRT having a second sub-design based on a few-layer metasurface nanostructure according to an embodiment.

FIG. 5A shows a unit cell 510 for a FLMN PRT having the second sub-design according to an embodiment. Cell 510 has a square base with dimensions of about $P_x=P_y=3.5$ μm, and a height of about 2.3 μm. The PRT may include a plurality of the unit cells arranged side by side like tiles, in the x and y directions. Cell 510 includes two L-shaped $VO_2$ resonators 512, a metallic (Al in this case) layer 514 and a dielectric ($SiO_2$ in this case) layer 516. The dimensions of these parts are shown in FIG. 5A. Other geometrical designs of the thermochromic resonators are possible, e.g., split-rings, rectangular patches, disks, and crosses.

FIG. 5A also includes insets 517 and 519, which show the field intensity at a wavelength of 10 μm above and below the phase transition ($T_{PC}^{VO_2}$) respectively. In particular, in 517, i.e., above $T_{PC}^{VO_2}$, $VO_2$ is metallic, and the high intensity field at the corners 518 of the L-shaped resonators indicate the presence of plasmonic resonances.

Figure 5B:
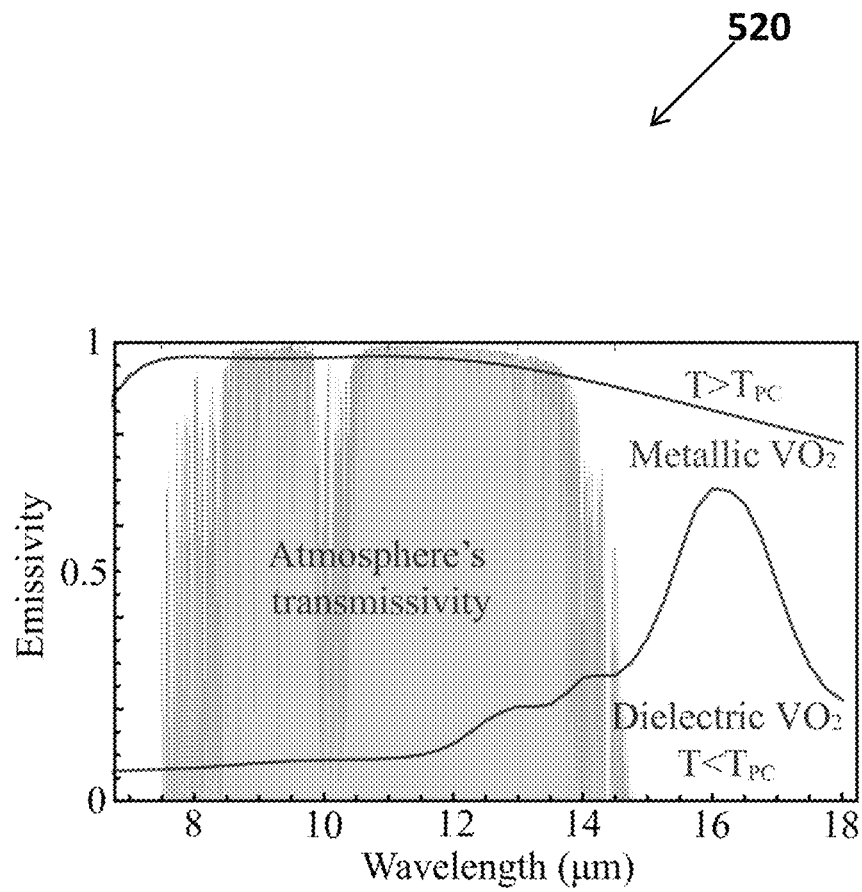
FIG. 5B shows a graph-set for a calculated emissivity of a few-layer metasurface nanostructure according to an embodiment.

FIG. 5B shows a graph-set 520 for the calculated emissivity of the FLMN PRT in the infrared frequency range corresponding to the first transparency window of the atmosphere according to some embodiments. For the calculations corresponding to this design, a transition temperature $T_{PC}^{VO_2}$ of 20° C. was assumed.

Graph-set 520 indicates the large contrast for temperatures above and below the phase transition temperature of $VO_2$. In particular, in the metallic phase, in cell 510, the plasmonic resonances are broad-band and occur over the whole 8-13 μm range of the atmosphere's first transmissivity window. They lead to emissivity values close to 1. In the dielectric phase, the emissivity values are small in the atmospheric transmissivity window.

Figure 6A:
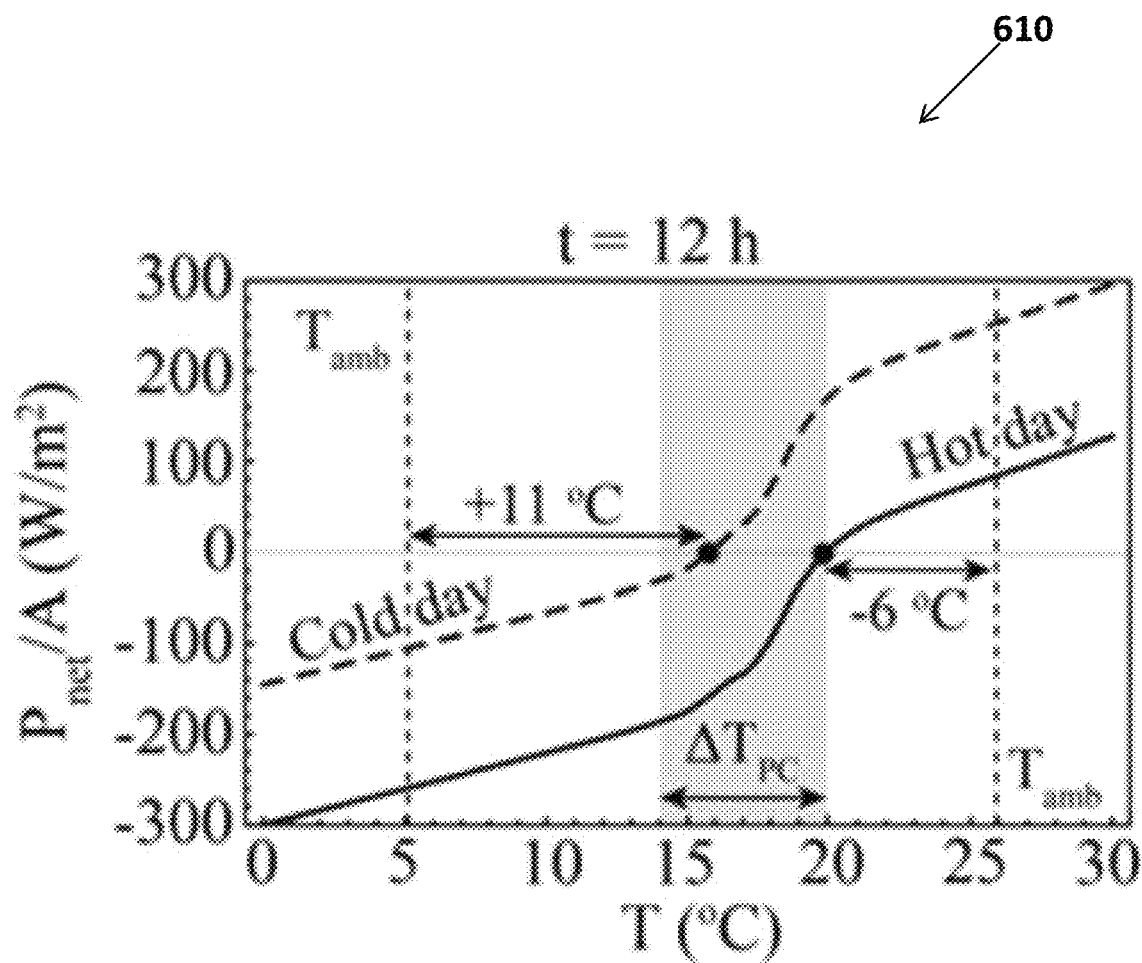
FIG. 6A shows a plot-set illustrating the temperature dependence of the net cooling/heating power of an illustrative PRT according to some embodiments.

FIG. 6A shows a plot-set 610 illustrating the temperature dependence of the net cooling/heating power of an illustrative PRT using the MLSN of FIG. 4A according to some embodiments. More specifically, the solid black curve shows the plot at midday of on a hot day with an ambient temperature of 26° C. (marked by the vertical dashed line on the right). And, the dashed black curve shows the plot at midday of on a cold day with an ambient temperature of 5° C. (marked by the vertical dashed line on the left). As explained in the description of FIG. 2A, the black dots indicate the corresponding equilibrium temperatures ($T_{eq}^{PRT}$) of the PRT. The plots show that on the hot day, the PRT equilibrates to $T_{eq}^{PRT}=20°$ C., indicating a 6° C. cooling with respect to the ambient temperature; and on the cold day it equilibrates to $T_{eq}^{PRT}=16°$ C., indicating a 11° C. heating with respect to the ambient temperature.

FIG. 6A shows that, for realistic $VO_2$ and unlike the abrupt behavior seen in FIG. 2A for the simplified model, here both $P_{net}(T)$ curves feature a smooth transitioning from heating ($P_{net}(T)<0$) to cooling ($P_{net}(T)>0$) as the temperature crosses the insulator-to-metal phase transition region. The daytime equilibrium temperature is slightly shifted with respect to $T_{PC}^{VO_2}$ and thermalization occurs within the range $\Delta T_{PC}=(17\pm3)$ ° C., where most of the phase transition takes place. A PRT may provide a remarkable high cooling power (per area) ~100 W/m² at temperatures above $T_{PC}^{VO_2}$ during a hot day, and a comparable heating power below the phase transition in a cold day. This results in an equilibrium temperature 6° C. below midday ambient temperature in summer, and 11° C. above midday ambient temperature in winter.

Figure 6B:
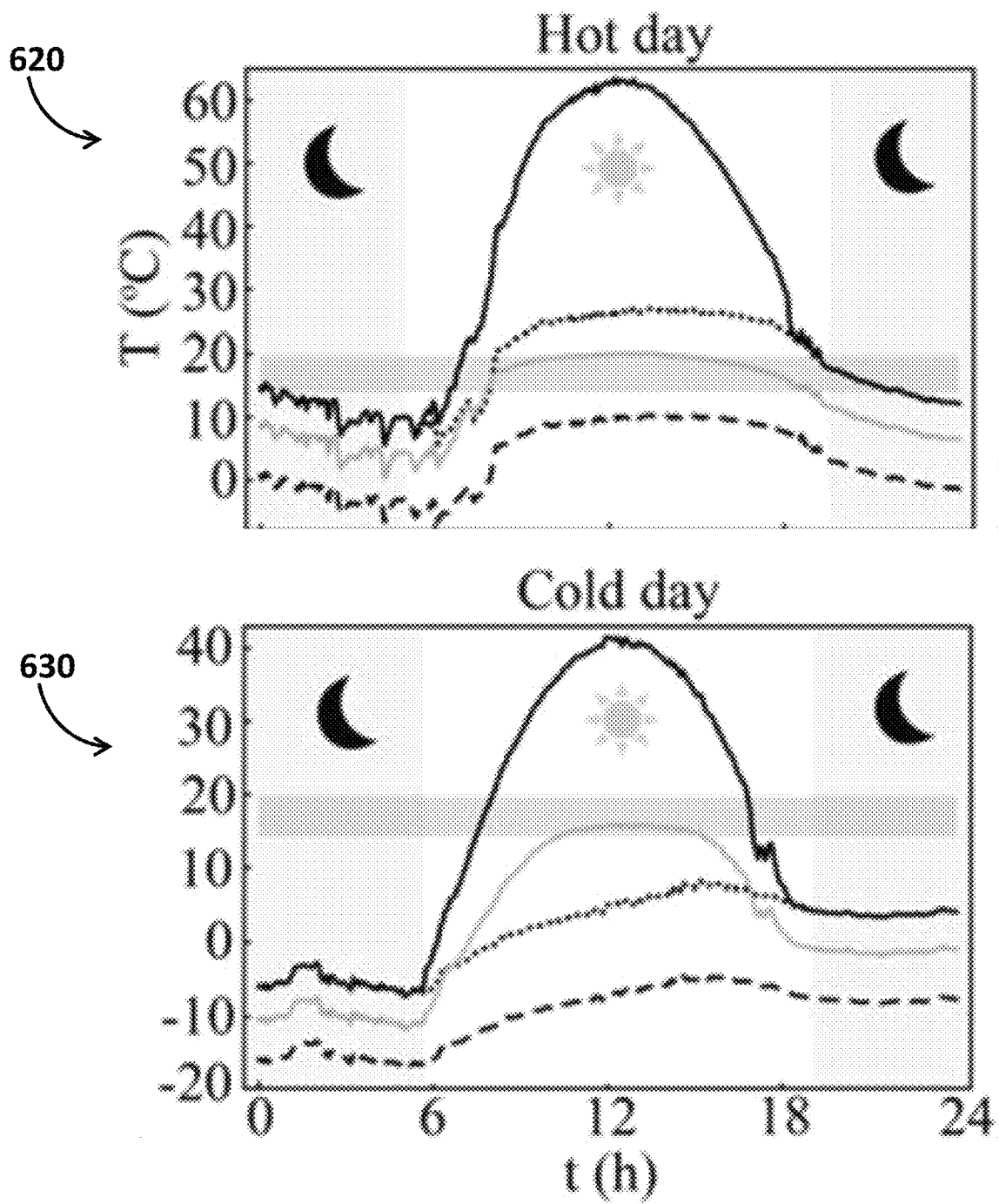
FIG. 6B shows schematic time dependent temperature diagrams of three types of objects along with the ambient temperature for a hot day and a cold day according to some embodiments.

FIG. 6B shows schematic time dependent temperature diagrams of three types of objects along with the ambient temperature for the hot day (diagram 620) and the cold day (diagram 630) according to some embodiments. More specifically, each diagram includes schematic graphs for the equilibrium temperatures of the illustrative PRT (solid gray), the idealized emitter (dashed black) and the idealized absorber (solid black); and for the ambient temperature (dotted black). The horizontal gray bands in each diagram ($\Delta T_{PC} \approx 6°$ C.) corresponds to the region around the phase transition temperature ($T_{PC}=17°$ C.) where ~90% of the phase-change takes place.

FIG. 6B illustrates the performance of the illustrative PRT under real conditions for operation in winter and summer in Los Alamos, New Mex. Measured sub-hourly time-dependent ambient temperature and solar irradiation data for two different days with clear sky were used in order to characterize the time-evolution of the equilibrium temperature of the PRT during both daytime and nighttime.

Diagrams 620 and 630 show the steady state (i.e., equilibrium) temperature of the illustrative PRT as the environment conditions change. They show a moderation effect occurring on the equilibrium temperature, which remains approximately locked at ~20° C. (~15° C.) around noon, regardless of variations in the ambient temperature during a hot or cold day. In both cases, daytime thermalization occurs at temperatures more comfortable than the undesirable cases achieved by the radiative absorbers and emitters. In contrast to the idealized case, at nighttime it is observed that a net cooling effect arises from the nonzero emissivity in the atmospheric transparency windows even when $VO_2$ is in its dielectric phase. Nevertheless, even in this case, the PRT's temperature is still above the one achieved with the plain radiative emitter. Locations with distinct variation ranges of the ambient temperature may benefit from different designs of the PRT, with the appropriate phase transition set point constrained by the environment's yearlong thermal swings. Given the high tunability of $T_{PC}^{VO_2}$ achieved via various approaches, a PRT may be designed to operate under climate conditions different from those described for Los Alamos, New Mexico herein. One may expect the same results described herein provided that $T_{PC}^{VO_2}$ is properly set for a given location.

Figure 7A:
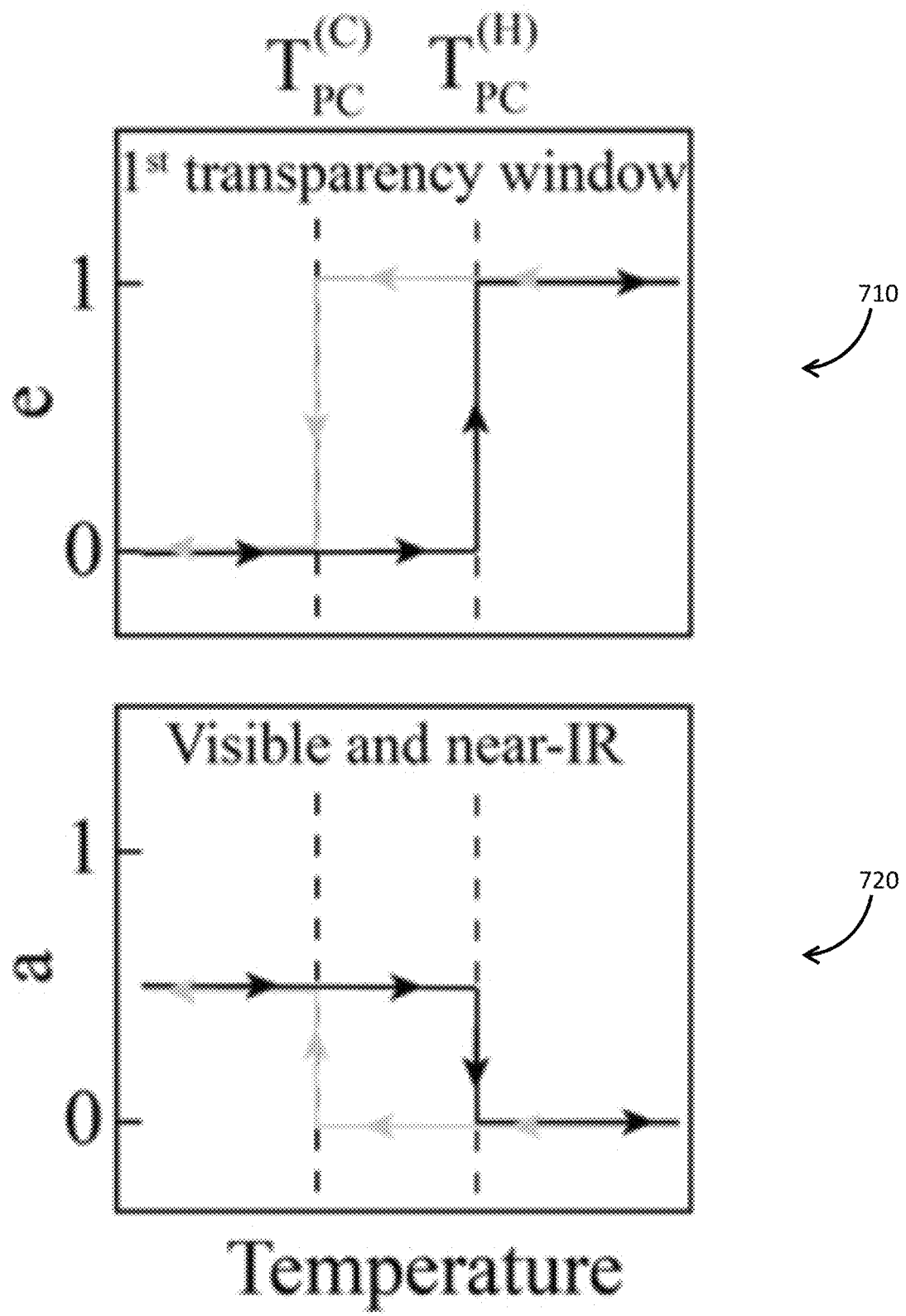
FIG. 7A illustrates a simple model of hysteresis in the illustrative PRT according to some embodiments.

The hysteresis effect may modify the behavior of a PRT according to some embodiments. FIG. 7A illustrates a simple model of hysteresis in the illustrative PRT according to some embodiments. In particular, FIG. 7A includes a diagram 710 for the emissivity and a diagram 720 for the absorptivity of the illustrative PRT. Diagram 710 shows a hysteresis cycle for the emissivity in the first transparency window; and diagram 720 shows a hysteresis cycle for the absorptivity at visible/near-IR wavelengths.

More specifically, diagrams 710 and 720 depict a two-step hysteresis loop with transition temperatures $T_{PC}^{(H)} > T_{PC}^{(C)}$ during heating and cooling processes. The PRT is assumed to behave as the idealized solar absorber for temperatures $T < T_{PC}^{(C)}$, and as the idealized emitter for $T > T_{PC}^{(H)}$. In the temperature range $T_{PC}^{(C)} < T < T_{PC}^{(H)}$ the PRT presents unity emissivity and zero absorption during cooling, while it shows zero emission and finite absorption when heating.

Figure 7B:
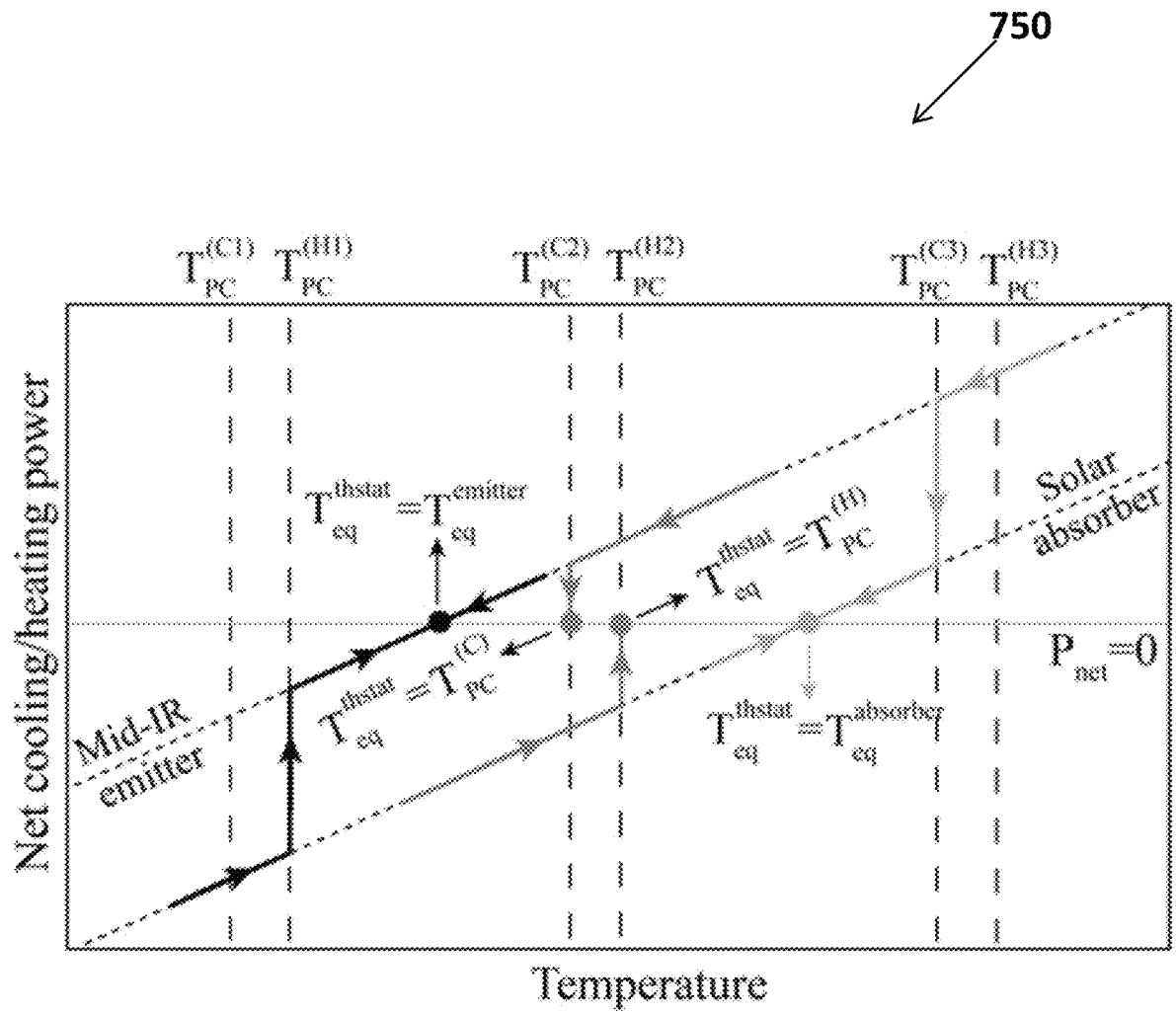
FIG. 7B includes a plot-set illustrating the temperature dependence of the net cooling/heating power at an arbitrary time of the day, for three illustrative PRTs, in accordance with some embodiments.

FIG. 7B shows the effects of the hysteresis on the equilibrium temperature of the PRT. In particular, FIG. 7B includes a plot-set 750 illustrating the temperature dependence of the net cooling/heating power at an arbitrary time of the day, for three illustrative PRTs with distinct hysteresis loops, in accordance with some embodiments. The plot also shows the corresponding $P_{net}(T)$ associated to the idealized emitter (upper dashed curve) and absorber (lower dashed curve), in manners similar to the illustrations of FIG. 2A. For each PRT, for $T < T_{PC}^{(C)}$, the PRT curves follow the absorber power curve, while for $T > T_{PC}^{(H)}$ it follows the one for the emitter. For temperatures in between, the PRT follows the emitter or absorber curves depending on its previous cooling or heating history.

FIG. 7B shows that there are four possible equilibrium temperatures for the PRT, $T_{PC}^{(C)}$; $T_{PC}^{(H)}$; $T_{eq}^{emit}$, and $T_{eq}^{abs}$. When both transition temperatures are below (above) $T_{eq}^{emit}$ ($T_{eq}^{abs}$) the PRT equilibrates at the emitter's (absorber's) equilibrium temperature, regardless of the hysteresis (black and light gray curves). When both thresholds are in between $T_{eq}^{emit}$ and $T_{eq}^{abs}$ (dark gray curve), the equilibrium temperature is locked either at $T_{PC}^{(C)}$ or $T_{PC}^{(H)}$ depending if the PRT is in a cooling or heating path.

The remaining three possible cases, not shown in the figure, can be analyzed in a similar fashion. For example, for $T_{PC}^{(C)} < T_{eq}^{emit} < T_{PC}^{(H)}$, $T_{eq}^{PRT} = T_{PC}^{(H)}$ during the heating cycle and $T_{eq}^{PRT} = T_{eq}^{emit}$ for cooling.

Figure 8:
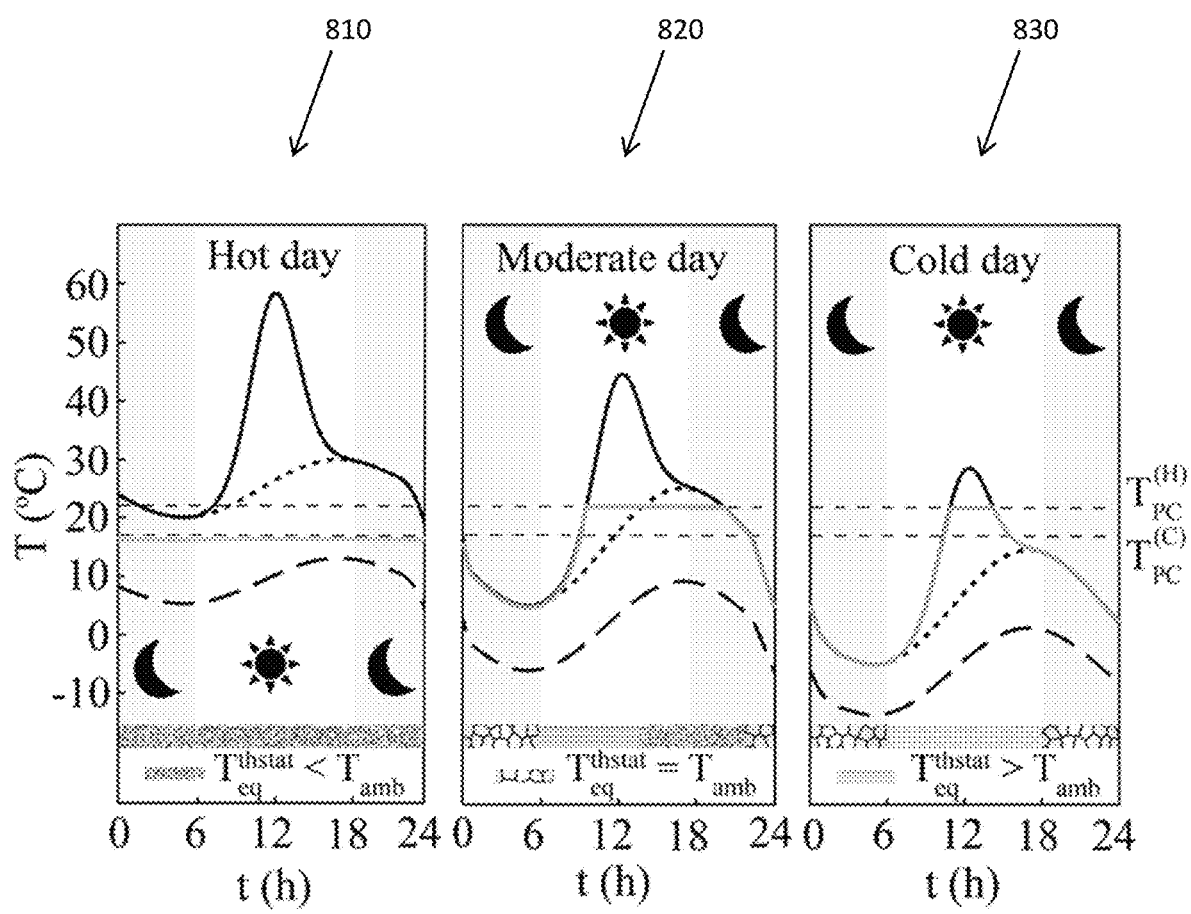
FIG. 8 illustrates a comparison between the performance of an idealized emitter, an idealized absorber, and a multilayer photonic nanostructure, in accordance with some embodiments.

FIG. 8 illustrates a comparison between the performance of an idealized emitter (long dashed curve), idealized absorber (solid black curve), and multilayer photonic nanostructure (solid gray curve) with $T_{PC}^{(C)}$=17° C. (lower horizontal dashed line) and $T_{PC}^{(H)}$=22° C. (upper horizontal dashed line) for a hot (left), moderate (center), and cold day (right), in accordance with embodiments. The bottom bars highlight the MLSN's switching between cooling and heating modes during a day depending on the corresponding ambient temperature (short dashed black curve). All parameters are the same as those of FIG. 2.

FIG. 8 shows the impact of hysteresis on the time-dependent equilibrium temperature for a hot day (diagram 810), a moderate day (diagram 820), and a cold day (diagram 830) according to some embodiments. Assuming that at midnight the PRT is in a cooling path, it was observed that temperature locked at $T_{PC}^{(C)}$ during the entire hot day, and locked at $T_{PC}^{(H)}$ during daytime for moderate and cold ambient temperatures. During night-time there was no difference with respect to the case without hysteresis. Based on these results, it may be concluded that, provided both phase transition temperatures are close, the hysteresis may not qualitatively affect the results described herein above.

For some embodiments, the optical properties of $VO_2$ were modeled in an arbitrary stage of the phase transition using the Bruggemann effective medium theory (BEMT). This analytical model predicts an insulator-to-metal transition at a critical concentration of metallic puddles in a dielectric host, and it has been successfully employed in previous experimental works to describe the dielectric constant of $VO_2$. In the BEMT the metallic inclusions are treated as randomly distributed and oriented spheroidal grains with a temperature-dependent filling factor $f = f(T)$ and depolarization factors $L_\perp$ and $L_\parallel$ parallel and perpendicular to an air-$VO_2$ interface. It was assumed that the $VO_2$ effective medium has uniaxial optical response described via the dielectric constant tensor $\bar{\epsilon}_{eff}(\lambda, T) = \text{diag}[\epsilon_{eff}^\parallel(\lambda, T), \epsilon_{eff}^\parallel(\lambda, T), \epsilon_{eff}^\perp(\lambda, T)]$, where the components parallel $\epsilon_{eff}^\parallel(\lambda, T)$ and perpendicular $\epsilon_{eff}^\perp(\lambda, T)$ to the interface are given by Eq. 8 below.

$$(1-f)\left\{\frac{\epsilon_d^{\parallel,\perp} - \epsilon_{eff}^{\parallel,\perp}}{\epsilon_{eff}^{\parallel,\perp} + L_{\parallel,\perp}(\epsilon_d^{\parallel,\perp} - \epsilon_{eff}^{\parallel,\perp})} + \frac{4(\epsilon_d^{\parallel,\perp} - \epsilon_{eff}^{\parallel,\perp})}{2\epsilon_{eff}^{\parallel,\perp} + (1 - L_{\parallel,\perp})(\epsilon_d^{\parallel,\perp} - \epsilon_{eff}^{\parallel,\perp})}\right\} + $$

$$f\left\{\frac{\epsilon_m - \epsilon_{eff}^{\parallel,\perp}}{\epsilon_{eff}^{\parallel,\perp} + L_{\parallel,\perp}(\epsilon_m - \epsilon_{eff}^{\parallel,\perp})} + \frac{4(\epsilon_m - \epsilon_{eff}^{\parallel,\perp})}{2\epsilon_{eff}^{\parallel,\perp} + (1 - L_{\parallel,\perp})(\epsilon_m - \epsilon_{eff}^{\parallel,\perp})}\right\} = 0.$$

Eq. 8

In Eq. 8 the wavelength and temperature dependencies have been omitted for clarity. Here, $\epsilon_d^{\parallel,\perp} = \epsilon_d^{\parallel,\perp}(\lambda)$ and $\epsilon_m = \epsilon_m(\lambda)$ are the wavelength-dependent dielectric constants of $VO_2$ in the purely dielectric ($T \ll T_{PC}^{VO_2}$; $f=0$) and metallic ($T \gg T_{PC}^{VO_2}$; $f=1$) phases, respectively. In the metallic phase, $\epsilon_m = \epsilon_m^\parallel = \epsilon_m^{195}$. In the numerical calculations presented herein above, hysteresis was neglected and the temperature-dependent filling factor was modeled via a logistic function $$f(T) = \left[1 + e^{-k\left(T - T_{PC}^{VO_2}\right)}\right]^{-1},$$

where the steepness of the curve is chosen as k=1 K$^{-1}$. The depolarization factor L$_{\|}$ is a function of the temperature-dependent filling factor f (7) of metallic puddles and was obtained by fitting the experimental data, while L$_\perp$=1–2L$_{81}$.

One possible criterion to quantify the performance of a given PRT design is to take the time-average of the absolute value of the difference between the equilibrium and set point temperatures normalized to the thermochromic material typical phase transition band. A smaller value of this figure corresponds to better PRT performance.

The passive thermal moderation mechanism described herein could be used to reduce the impact of material stresses on structures such as bridges undergoing thermal cycles. In addition, accomplishing environmentally friendly materials for temperature control would strongly impact the United States' energy landscape, where heating and cooling of residential and commercial structures account for about one-third of the electricityuse, making them e largest energy expense in the country.

CONCLUSION AND GENERAL TERMINOLOGY

The above detailed description refers to the accompanying drawings. The same or similar reference numbers may have been used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

The foregoing description of the embodiments has been presented for purposes of illustration only. It is not exhaustive and does not limit the embodiments to the precise form disclosed. While several exemplary embodiments and features are described, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. As used herein, the singular forms "a," "an," and "the" may include the plural forms unless the context clearly dictates otherwise. Further, the term "coupled" does not exclude the presence of intermediate elements between the coupled items. Also, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set.

Further, if used in this disclosure, and unless stated or deducted otherwise, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable may be an increasing or a decreasing function of a second variable if, respectively, the first variable is directly or inversely proportional to the second variable.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents. Further, the present disclosure is directed toward all novel and non-obvious features and aspects of the various disclosed embodiments, alone and in various combinations and sub-combinations with one another.

While the present disclosure has been particularly described in conjunction with specific embodiments, many alternatives, modifications, and variations will be apparent in light of the foregoing description. It is therefore contemplated that the appended claims will embrace any such alternatives, modifications, and variations as falling within the true spirit and scope of the present disclosure.

What is claimed is:

1. A passive radiative thermostat comprising:
 a mid-infrared (IR) emitter with a first band emissivity within a first atmospheric transparency window and a second emissivity band outside of the first atmospheric transparency window; and
 a solar radiation absorber with a first absorptivity band in a visible and near IR-range and a second absorptivity band outside of the visible and near IR-range.

2. The passive radiative thermostat of claim 1 that includes a thermochromic material configured to induce a phase change between an optical transparent dielectric phase and an optically opaque metallic phase.

3. The passive radiative thermostat of claim 2 formed in a stack comprising a metallic layer, a dielectric spacer disposed over the metallic layer, and a thermochromic layer formed over the dielectric spacer.

4. The passive radiative thermostat of claim 3, wherein absorptivity is dependent on dissipative properties associated with the dielectric spacer and phase change properties of the thermochromic material.

5. The passive radiative thermostat of claim 2, wherein higher solar absorption occurs for temperatures below a temperature associated with phase transition zone of the thermochromic phase material in comparison to a lower solar absorption associated with temperatures above the temperature associated with the phase transition zone.

6. The passive radiative thermostat of claim 2, wherein the mid-IR emitter is configured to produce weaker electromagnetic resonances for temperatures below the phase transition zone in comparison to electromagnetic resonances for temperatures above the phase transition zone.

7. The passive radiative thermostat of claim 6, wherein a level of emission is dependent on dispersive properties of electromagnetic resonances including a resonant frequency, bandwidth, and amplitude.

8. The passive radiative thermostat of claim 6, wherein a temperature of the passive radiative thermostat, initially below the phase transition temperature, increases until a constant equilibrium value within the temperature phase transition zone is reached.

9. The passive radiative thermostat of claim 8, wherein a temperature of the passive radiative thermostat, initially above the phase transition temperature, decreases until a constant equilibrium value within the temperature phase transition zone is reached.

10. The passive radiative thermostat of claim 6 wherein a temperature changes based on emissivity of the mid-IR emitter and further based on absorption of the solar radiation absorber until the temperature reaches an equilibrium value within the temperature phase transition zone.

11. The passive radiative thermostat of claim 10, wherein the equilibrium temperature depends on whether an initial temperature is above or below the temperature phase transition zone and wherein the equilibrium temperature is further based on the presence or absence of thermal hysteresis.

12. The passive radiative thermostat of claim 1, wherein the mid-IR emitter and the solar radiation absorber are configured to self-regulate thermal swings during daytime.

13. The passive radiative thermostat of claim 12, wherein the self-regulation operates both in presence and absence of thermal hysteresis of a material within the mid-IR emitter and the solar radiation absorber.

14. The passive radiative thermostat of claim 12, wherein the mid-IR emitter and the solar radiation absorber lock to a temperature associated with a phase transition temperature of a thermochromic material of the mid-IR emitter and the solar radiation absorber.

15. The passive radiative thermostat of claim 14, wherein the temperature lock is independent of an ambient temperature.

16. The passive radiative thermostat of claim 14, wherein the locking to the temperature occurs during daytime.

17. The passive radiative thermostat of claim 12, wherein a temperature is locked within a width of the phase transition temperature of a thermochromic material within the mid-IR emitter and the solar radiation absorber.

18. The passive radiative thermostat of claim 17, wherein the value of the—locked temperature is an equilibrium temperature of a dynamical thermalization processes.

19. The passive radiative thermostat of claim 1, wherein a sole energy source for the passive radiative thermostat is solar radiation.

20. A method of manufacturing a passive radiative thermostat, the method comprising:
providing a mid-infrared (IR) emitter with a first band emissivity within a first atmospheric transparency window and a second emissivity band outside of the first atmospheric transparency window; and
adding a solar radiation absorber with a first absorptivity band in a visible and near IR-range and a second absorptivity band outside of the visible and near IR-range.

21. The method of claim 20, wherein the mid-IR emitter and the solar radiation absorber are configured to self-regulate thermal swings during daytime.

22. The method of claim 21, wherein the self-regulation operates both in presence and absence of thermal hysteresis of material within the mid-IR emitter and the solar radiation absorber.

23. The method of claim 21, wherein the mid-IR emitter and the solar radiation absorber lock to a temperature associated with a phase transition temperature of a thermochromic material of the mid-IR emitter and the solar radiation absorber, and wherein the locking to the temperature occurs during daytime.

24. The method of claim 20, wherein a sole energy source for the passive radiative thermostat is solar radiation.

25. The method of claim 20, wherein the thermochromic material is configured to induce a phase change between optical transparent dielectric phase and an optically opaque metallic phase and wherein the method further comprises forming a stack comprising a metallic layer, a dielectric spacer disposed over the metallic layer, and a thermochromic layer formed over the dielectric spacer.

26. The method of claim 25, wherein the phase change is adjusted by doping, straining, or nano-structuring.

* * * * *